(12) United States Patent
Galante et al.

(10) Patent No.: US 12,338,847 B2
(45) Date of Patent: Jun. 24, 2025

(54) BUCKLE WITH TENSION INDICATOR

(71) Applicant: Band-It-IDEX, Inc., Denver, CO (US)

(72) Inventors: Stephen C. Galante, Denver, CO (US); Ryan M. Stoltz, Commerce City, CO (US)

(73) Assignee: Band-It-IDEX, Inc., Denver, CO (US)

( * ) Notice: Subject to any disclaimer, the term of this patent is extended or adjusted under 35 U.S.C. 154(b) by 0 days.

(21) Appl. No.: 18/542,244

(22) Filed: Dec. 15, 2023

(65) Prior Publication Data
US 2024/0200584 A1 Jun. 20, 2024

Related U.S. Application Data

(60) Provisional application No. 63/433,287, filed on Dec. 16, 2022.

(51) Int. Cl.
| | | |
|---|---|---|
| *F16B 2/08* | (2006.01) | |
| *B65B 13/02* | (2006.01) | |
| *B65B 13/22* | (2006.01) | |
| *B65D 63/08* | (2006.01) | |

(52) U.S. Cl.
CPC ............. *F16B 2/08* (2013.01); *B65B 13/025* (2013.01); *B65B 13/22* (2013.01); *B65D 63/08* (2013.01); *F16B 2200/95* (2023.08)

(58) Field of Classification Search
CPC ...... F16B 2/08; F16B 2200/95; B65B 13/025; B65B 13/22; B65D 63/08
See application file for complete search history.

(56) References Cited

U.S. PATENT DOCUMENTS

| | | | | |
|---|---|---|---|---|
| 3,696,471 A | * | 10/1972 | Mermelstein | A44B 11/12 24/193 |
| 4,015,311 A | * | 4/1977 | Curtis | F16L 33/023 24/23 R |
| 8,926,651 B2 | | 1/2015 | McDonald et al. | |
| 10,479,572 B2 | * | 11/2019 | De Vittori | B65D 63/08 |
| 11,037,039 B2 | * | 6/2021 | Smith | G06F 1/181 |
| 2003/0070269 A1 | * | 4/2003 | Chung | A43C 7/08 24/714.6 |
| 2008/0312682 A1 | | 12/2008 | Shams et al. | |
| 2009/0168612 A1 | | 7/2009 | Robin et al. | |
| 2010/0326219 A1 | * | 12/2010 | Nelson | G09F 3/0295 24/16 R |
| 2012/0054991 A1 | * | 3/2012 | DeBerry | A44B 11/12 24/265 BC |
| 2015/0047161 A1 | * | 2/2015 | Hillegonds | B65B 13/345 29/3 |
| 2021/0085335 A1 | | 3/2021 | Dahl | |
| 2021/0400917 A1 | | 12/2021 | Sayers et al. | |

OTHER PUBLICATIONS

International Search Report and Written Opinion for International (PCT) Patent Application No. PCT/US23/84400, dated May 1, 2024 19 pages.

* cited by examiner

*Primary Examiner* — David M Upchurch
(74) *Attorney, Agent, or Firm* — Sheridan Ross P.C.

(57) ABSTRACT

A buckle and a band for installation onto a workpiece are provided. The buckle includes a tension indicator for indicating when a desired tension on the band has been reached during installation. The tension indicator may be a visual indicator and may include two collapsible wings that are in a first position when untensioned and move to a second position when tensioned.

26 Claims, 24 Drawing Sheets

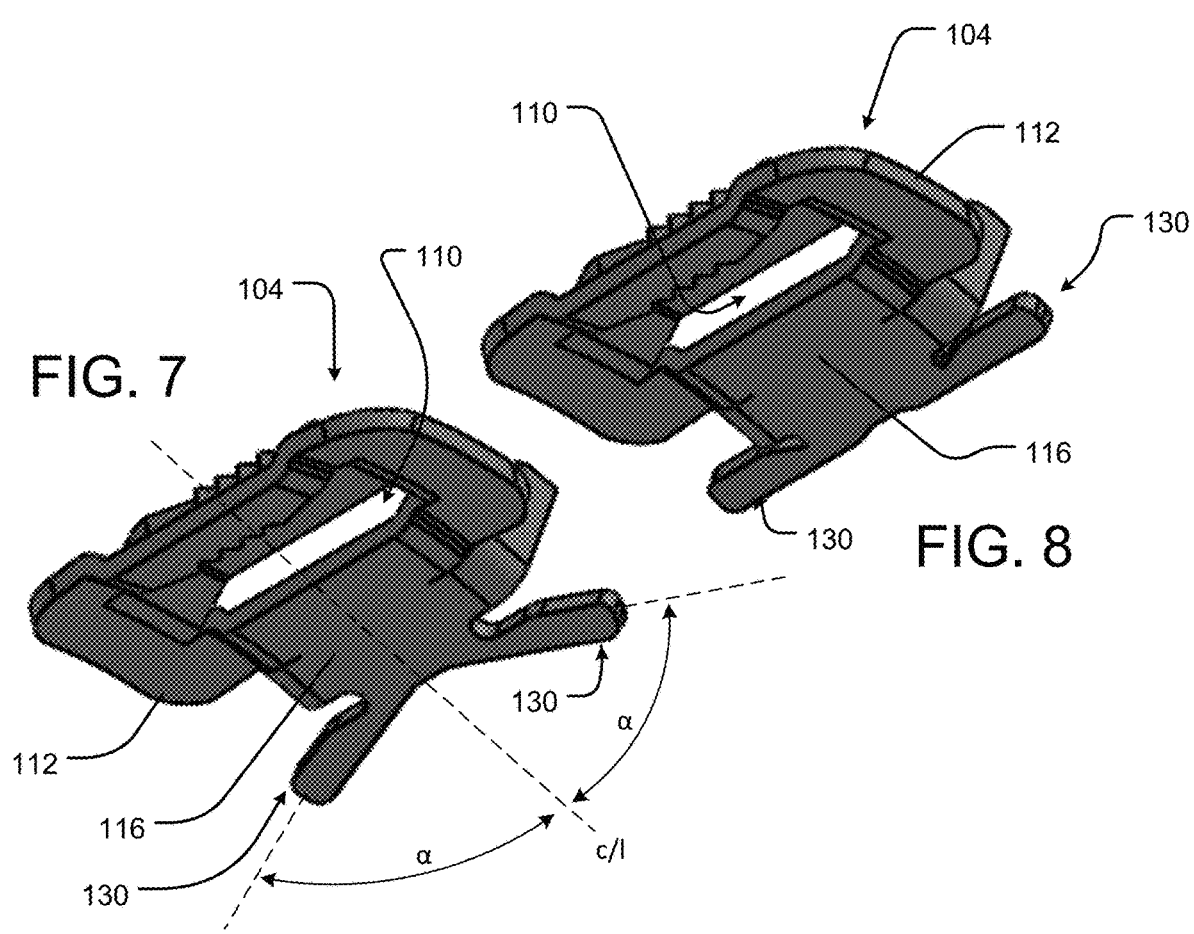

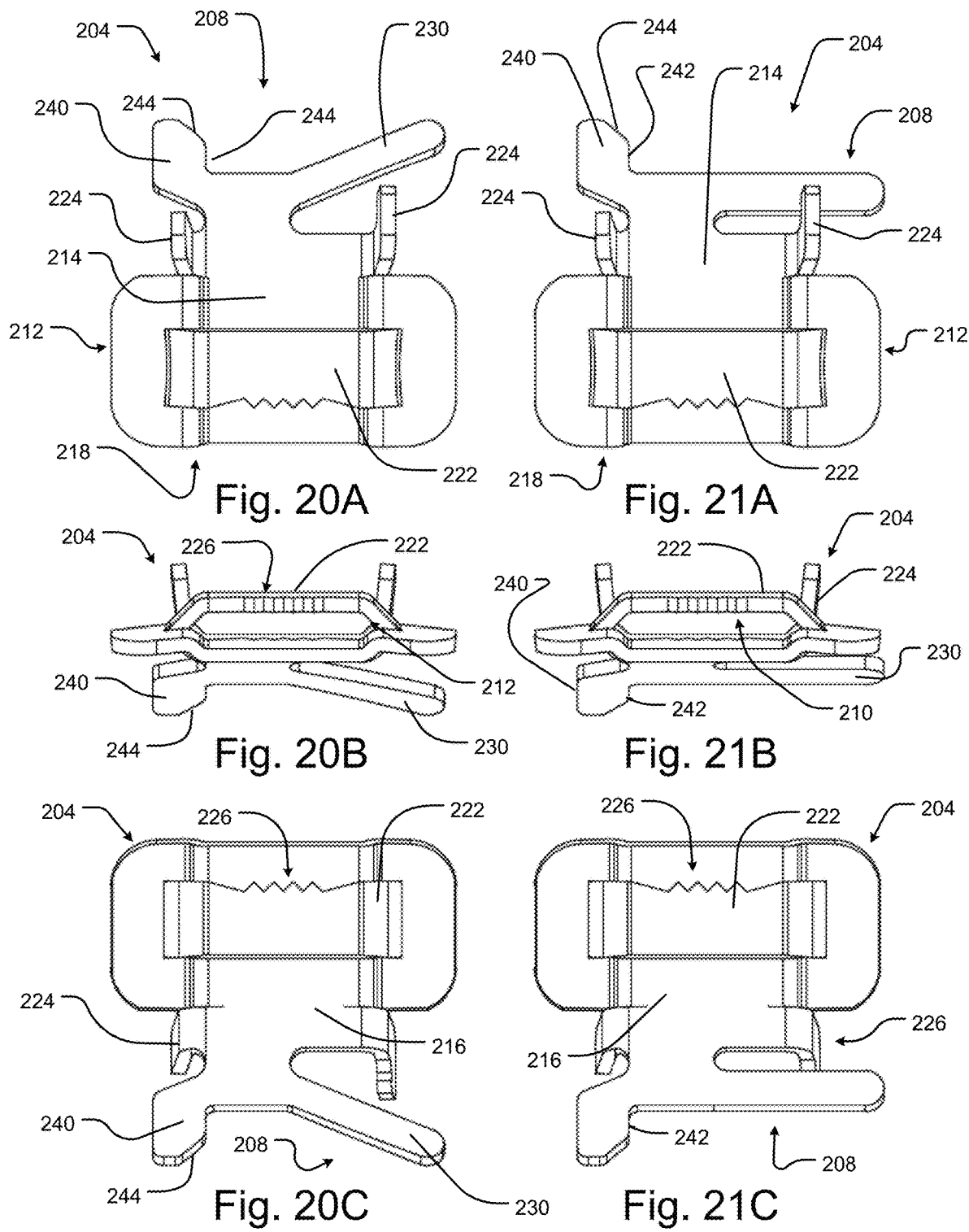

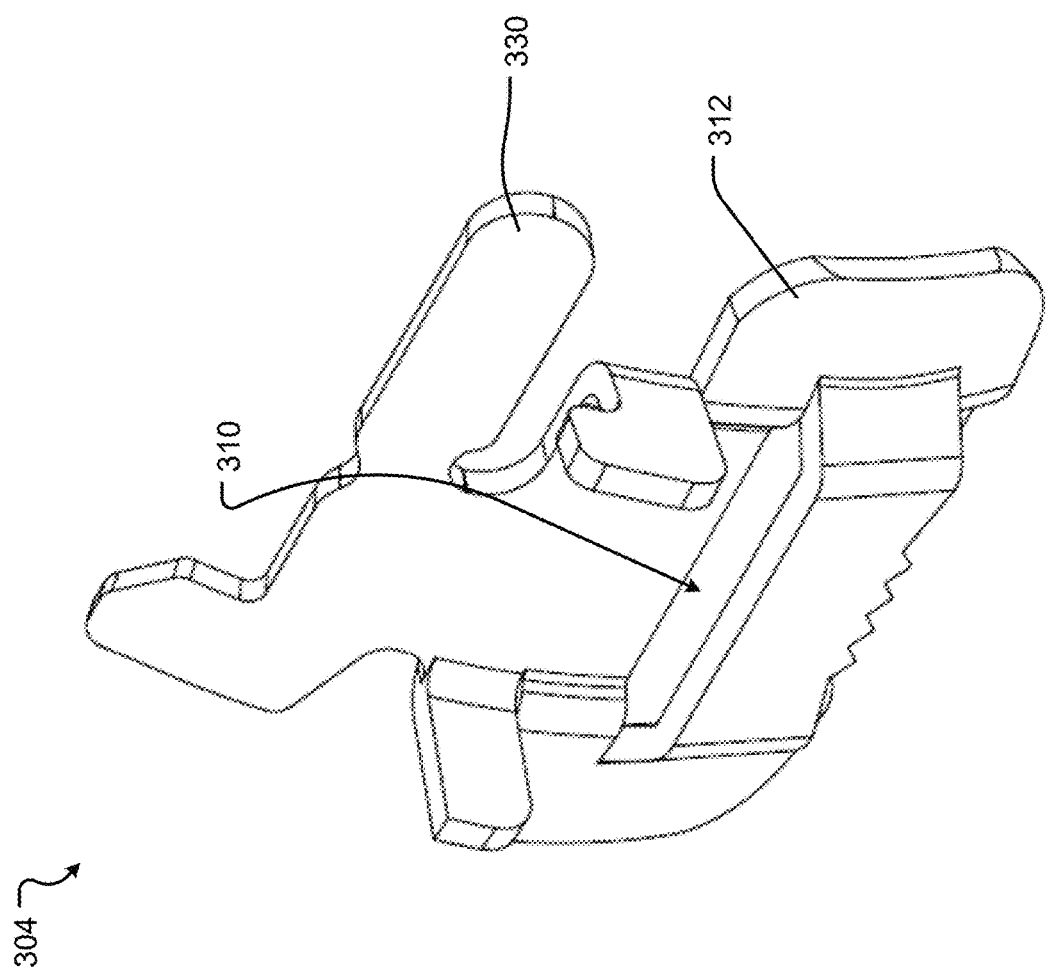

BUCKLE WITH TENSION INDICATOR

This U.S. Non-Provisional patent application claims the benefit of priority from U.S. Provisional Patent Application Ser. No. 63/433,287, filed Dec. 16, 2022, the entire disclosure of which is hereby incorporated by reference.

FIELD OF THE INVENTION

Embodiments of the present invention are related generally to installing bands with a buckle clamp assembly, and in particular to a buckle with a tension indicator to visually indicate when a desired tension on the band is reached.

BACKGROUND

Users want to know that when they install band and buckle clamp assemblies, the bands have the correct amount of retained force and installations are consistent from installer to installer. Some installation tools, for example, model UL 4000-D sold by BAND-IT—IDEX, Inc, Denver, Colorado, USA, is configured to monitor and set the tension applied to a band during installation. Such automated tools tend to be more expensive compared to manual tools and therefore much less likely to be used in situations where multiple installers each require their own tool. Because manual tensioning tools are generally robust and reliable, and were introduced much earlier in time compared to automated tensioning tools and are less expensive, manual tensioning tools vastly outnumber automated tensioning tools in use today for installing band clamps. Therefore, there is a need in the market to sidestep the prohibitive cost of automated tools and develop a clamping technique that repeatedly and reliably achieves a targeted retained force using a manual tool. The embodiments according to the present disclosure achieve this objective by incorporating a tension indictor into the design of the buckle not the tool.

Manual installation tools and procedures used with existing band and buckle clamps do not assess or indicate to the user the amount of applied force or the amount of retained force of a band achieved as a part of installation. Currently, the clamp design and manual installation procedure doesn't provide the installer or user confidence that the bands are installed correctly. Due to the nature of the tools and installation methods, an installer applies a force to the tool, which in turn applies a force to the band and buckle to achieve a targeted retained force (or clamp force). However, following installation, the retained or clamped force can vary significantly from installer to installer particularly for new or inexperienced installers. In many instances, there is no obvious visual indicator, such as a physical feature on the band or buckle, that definitively tells or indicates that the bands have been installed correctly. Additionally, current band and buckle designs used with manual tensioning tools require an installation procedure which introduces high variability from user to user and the possibility of an over or under tensioned clamp. Under tensioned clamps can move, vibrate, or provide insufficient retained force for an application, while over tensioned bands can cause bands or buckles to tear resulting in a failed product.

With reference to FIG. 1, a manual tensioning tool (model C00169) sold by BAND-IT-IDEX Corporation, Denver, Colorado, USA, is shown. A Band-It three-quarter inch Ear-Lokt buckle associated three-quarter inch band, each also made and sold by BAND-IT-IDEX Corporation, are also illustrated and engaged with the tool. An enlarged illustration of the buckle is shown in FIG. 3. As illustrated in FIG. 1, the band is ready for tensioning. The tool 10 includes a frame 12, a nose 20 attached to the frame, a band slot 22 located in the nose 20, a gripper 24, a clamp lever 26 and a rotary tension handle 28 interconnected to the gripper 24 by a threaded rod 30. After placing the band 32, buckle 34, and objects to be clamped in the proper position, in a first step the user or installer tensions the band by rotating the tension handle 28 to pull the gripper 24 away from the nose 20. In a second step, illustrated in FIGS. 2A and 2B, while the band is still secured in the tool 10, the tool is rotated away from the user or installer to roll over the band and tool over the buckle while the user also unwinds the tension handle 28 to release some tension in the band. Excess band length 32 is then cut off by activating the cutting lever 36. If the buckle includes retaining tabs 38 or "ears", the user then bends the two retaining tabs 38 over the free end of the band in order to secure further the band in place. If the band is under-tensioned by the installer in the first step, the targeted retained force is not met and the installation fails. If the installer over tensions the band in the first step and fails to release the over tension during the second step, when the tool is used to bend the band around the buckle, the band will often yield and break and the installation fails. As a result, tension must be released from the band by the installer prior to or as part of the second step. When using a manual tool, the level of tension to apply in the first step and the amount of tension to release in connection with the second step is not displayed or otherwise quantified for the installer. The correct amount of tension to apply and the correct amount of tension to release is learned with experience and repetition and can vary among installers. Under tensioning is often a greater concern that over tensioning because in most situations were a band is over tensioned, the band will tear, crack or even break. When a band is under tensioned there typically is no visual indication to the installer or an inspector.

To address some of these problems, some current manual tensioning procedures rely on an installer to monitor the movement of stamped indicia on the band or installer drawn markings placed on the band. When the indicia or markings stop moving during tensioning, the band has reached the yield point and should not be tensioned any more. In reality, tensioning until the band no longer moves over tensions the band and also introduces subjectivity into the tensioning process undermining the objective of consistency and repeatability. To prevent adding more tension in the band or tearing the band in connection with step two, prior to cutting the excess band off and locking it in place, the installer unwinds the tensioning handle 28, typically by about a half turn, while rotating the tool and band over the buckle. If the unwinding step is done incorrectly, two results can occur. First, if not enough tension is eliminated, the band can tear on the teeth of the buckle and result in the installer redoing the entire procedure with a new band and buckle. Second, the tensioning mechanism can be unwound too far resulting in an insufficient or low retained force and causing the band to fail by not securing the desired component to the targeted structure, pole or object.

In summary, the existing design of band and buckle clamps used with a manual tensioning tool does not provide an indicator that proper tension has been achieved and requires an installation procedure which is inherently variable and subject to user error and incorrect installations. Accordingly, there is a need in the area of band clamping for an improved system, method and apparatus of manually tensioning a band relative to a buckle and circumscribed object that provides consistency and repeatability among all installers regardless of experience.

SUMMARY

By adding a visual feature in the buckle that yields at a known tensile range and provides a predetermined orientation, the installer has a non-subjective indicator that indicates that the band and buckle are installed correctly with the targeted retained force to hold the desired component in place. Since there is an indication that proper tension has been achieved, the new designed buckle enables an installation procedure which does not require the user to release tension during roll over and thus greatly reduces installation variability while also increasing the band retained force. It also provides post-installation visual verification that a minimum targeted force was applied by the installer to the band and buckle.

For installation, one end of the band is bent back on itself to form a loop of band material. In one embodiment, the loop is wrapped around the leading end of the buckle while the opposite free end of the band is threaded through the buckle opening, around the object or objects being bound, and is fed back through the buckle opening once again. An automatic or manual hand tool engages and pulls the free end of the band through the buckle opening, adding a tensile force to the band. To resolve or at least reduce the subjectivity involved in correctly tensioning the band, in one embodiment according to the present disclosure, two strips or tabs of metal, referred to as wings, are formed integral with the buckle at the leading end of the buckle. The wings may be in the same plane as the buckle base or slightly above the same plane as the buckle base. The two wings could be asymmetric, each could have a different geometry, or each formed from a different material, etc. It will be appreciated that in other embodiments, the tabs or metal wings can be in a different plane as the buckle base. The wings extend outwardly from the buckle at an acute angle relative to the centerline of the buckle. In at least one embodiment, the tips of the wings extend outwardly beyond the lateral or side edges of the band.

In one embodiment, the wings are formed at the leading end of the buckle and one or more loops of band material wrap over the wings and through the buckle. The tips of the wings are visible to the installer with the band in place. During tensioning, the hand tool pulls the free end of the band causing the band to move through the buckle while the one or more loops of band material cause the buckle wings to move from a first position to a second position. The buckle wings bend under the resultant compressive force of the one or more loops of band material caused by the tensile force from the hand tool. Increasing the tension in the band reorients or repositions the wings to a predetermined second position and visually indicates the correct tension has been met.

In another embodiment according to the present disclosure, a single tab or wing is provided proximate the leading end of the buckle. The single tab or wing extends laterally outward from the body of the buckle in a first position at an acute angle relative to the centerline of the buckle. The tip or distal end of the tab or wing may extend past the lateral edge of a band held by the tensioning tool. Optionally, the buckle may also include a band guide extending from the body of the buckle proximate the leading end which functions to engage and align the opposite lateral or side edge of a band. The guide assists in properly orienting the band relative to the buckle. The guide may include a chamfered leading edge to assist in orienting the band into the guide.

In yet another embodiment according to aspects of the present disclosure, the one or more tension indicating tabs or wings may include one or more cut out portions, notches or surface configurations within the geometry of the tab and/or buckle that establish one or more locations where the tab or wing will bend or deform upon tensioning by the installation tool. The purpose of the particularized surface configuration is to create one or more locations where the wing or buckle will deform and thereby control the manner in which the wing bends or deforms. Such one or more surface configurations also assist in predetermining the location and position of the wing indicating that the targeted tension has been attained.

In other embodiments according to aspects of the present disclosure, the shape of the tab or wing may include enhancements or extensions that assist in identifying when a proper or intended tension is achieved. A shape or profile of a tab or wing may be such that one edge of a tab or wing is designed and configured to abut an edge of the body of the buckle and form a linear interface where the edges abut in a parallel orientation. In another embodiment, a leg or flange my extend from either the body of the buckle or the tab or wing such that upon deformation during tensioning, the leg or flange contacts the body of the buckle (if the leg is formed on the tab or wing) or contacts the tab or wing (if the leg is formed on the body of the buckle) to provide a visual indication to the installer that the band it properly tensioned. If the leg or flange is sufficiently robust, it may also prevent or reduce the likelihood of the operator over tensioning the band by resisting tensioning once contact is made between the leg or flange, on one side, and the buckle or tab/wing, on the other side.

Since the desired tensile force in the band can be predetermined by the material properties and geometry of the wing or wings, the tensile force indicator can be designed at less than the material yield strength of the band. The amount of force applied by the installer to the tool to achieve repositioning of the tension indicators, the wing or wings, correlates to the desired or targeted retained force for the installed band and buckle. This allows the installer to skip the subjective step of unwinding the tool tensioning screw while folding the band on top of itself and reduces the likelihood of the installation resulting in an under tensioned band. Once the indicator fully activates, the installer can simply fold the band over itself, cut it, and lock it into place by bending the buckle ears over the band. By removing the unwinding step, the retained force has been shown to be both higher on average and consistently attained, therefore reducing variability seen from installer to installer. Additionally, this targeted retained force is achieved at a lower maximum clamping force, which can be advantageous for a number of potential reasons including increased factor of safety on band/buckle damage, tool complexity/strength, etc.

In yet another embodiment, the locking ears may be configured with an alignment feature that provides the installer with a visual indication that the tension indicator completely moved to the second or installed position. For example, adding an extension or nose to at least one of the locking ears provides a sight line indicative of the tension indicator being in the desired second position.

DRAWINGS

The accompanying drawings, which are incorporated in and constitute a part of the specification, illustrate embodiments of the invention and together with the general description of the invention given above and the detailed description of the drawings given below, serve to explain the principles of these inventions. It should be understood, of course, that the invention is not necessarily limited to the particular embodiments illustrated herein.

FIG. 7 is a bottom, tilted view of the buckle of FIG. 6 with a tension indicator in an untensioned or first state.

FIG. 8 is a bottom, tilted view of the buckle of FIG. 7 with the tension indicator in a second or fully tensioned state.

FIG. 20A is a top view of the buckle of FIG. 16 with a tension indicator in an untensioned or first state.

FIG. 20B is a front view of the buckle of FIG. 20A.

FIG. 20C is a bottom view of the buckle of FIG. 20A.

FIG. 21A is a top view of the buckle of FIG. 16 with a tension indicator in a second or fully tensioned state.

FIG. 21B is a front view of the buckle of FIG. 21A.

FIG. 21C is a bottom view of the buckle of FIG. 21A.

FIG. 27B is an isometric view of the buckle of FIG. 27A.

DESCRIPTION

Figure 4:
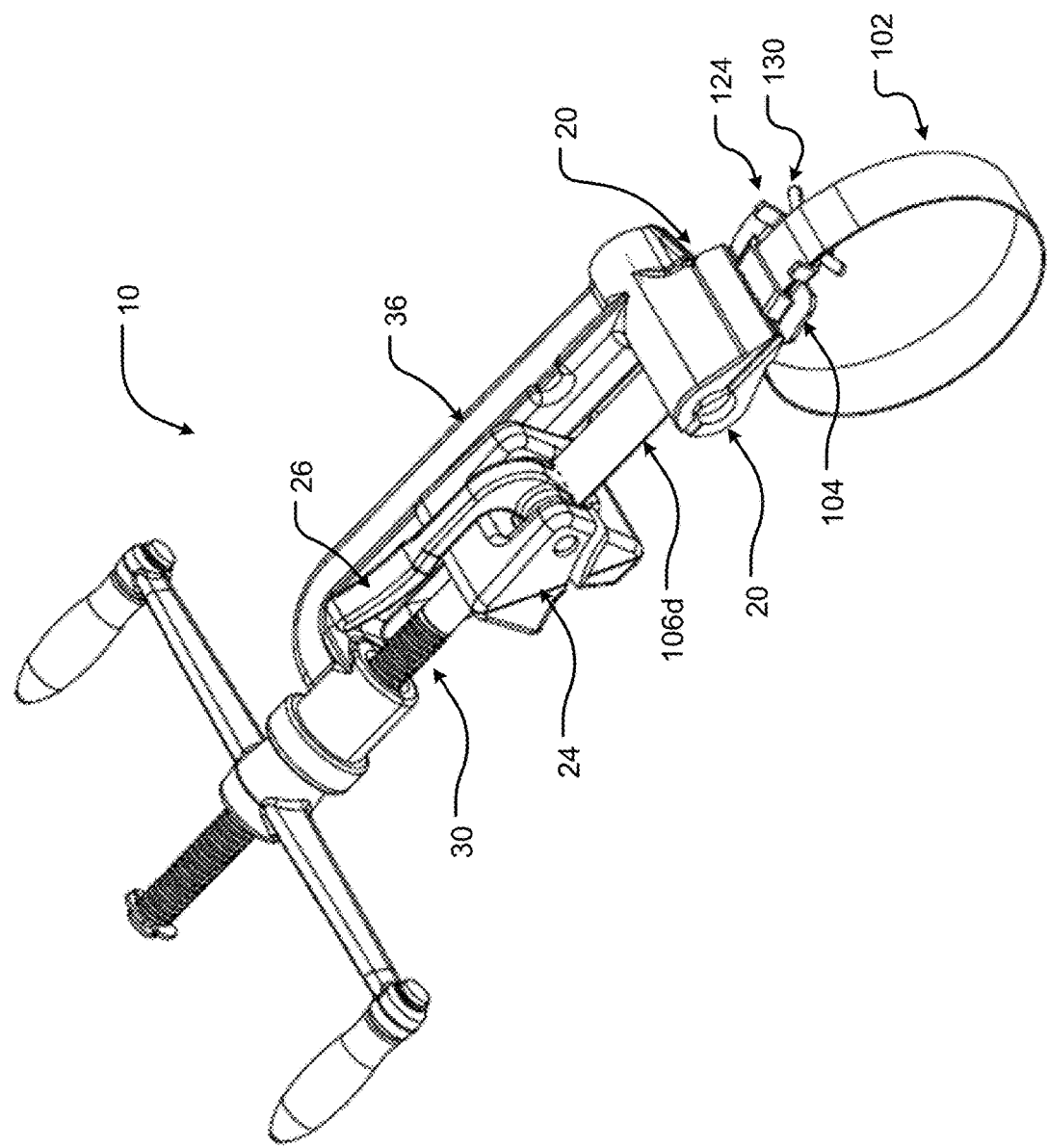
FIG. 4 is an isometric view of the prior art manual tension tool and band of FIGS. 1 and 2, with a first embodiment of a buckle according to aspects of the present disclosure.
Figure 5:
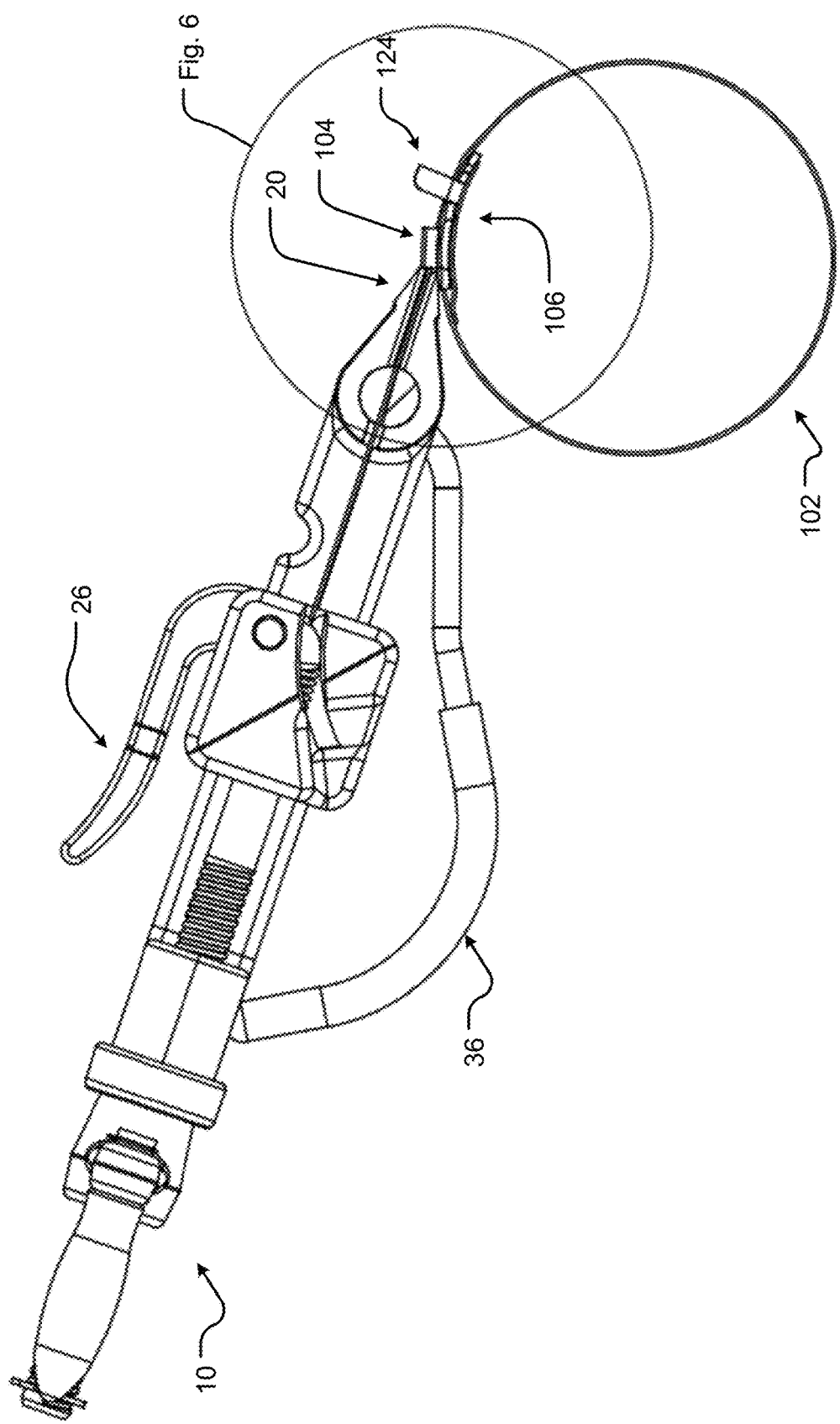
FIG. 5 is a side view of the tension tool, band and buckle of FIG. 4.
Figure 6:
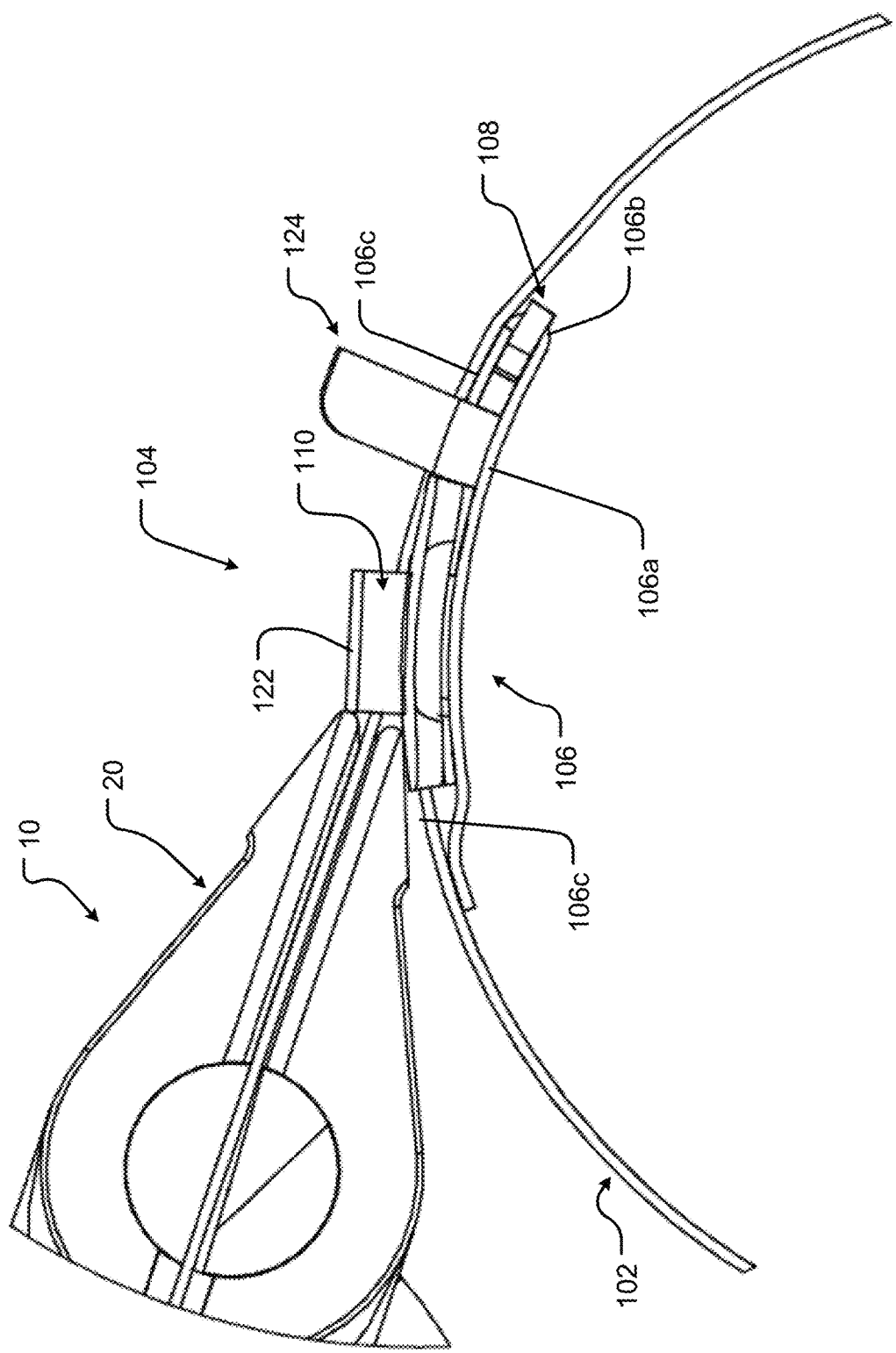
FIG. 6 is an enlarged view of a portion of the tension tool, band and buckle of FIG. 5 as noted in FIG. 5.

FIGS. 4-6 illustrate a tension tool 10 used to install a band 102 and a buckle 104 to a workpiece. The tension tool 10 can be handheld. A manual tool is illustrated. In other embodiments, the tool 10 could also be motorized or automatic or mounted to a fixed structure. With reference to FIGS. 5 and 6, a loop of band 106 is formed at one end of the band by the installer either prior to installation or during installation. One portion of the loop 106a is positioned under the buckle 104. A second portion 106b comprising a bend in the loop wraps around the leading end 108 of the buckle 104. A third portion of the loop 106c extends through an opening 110 in the buckle 104 and the opposite or free end of the band is wrapped around the workpiece (e.g., a pole, structure or one or more objects) and back through the buckle opening 110 once again.

Figure 2A:
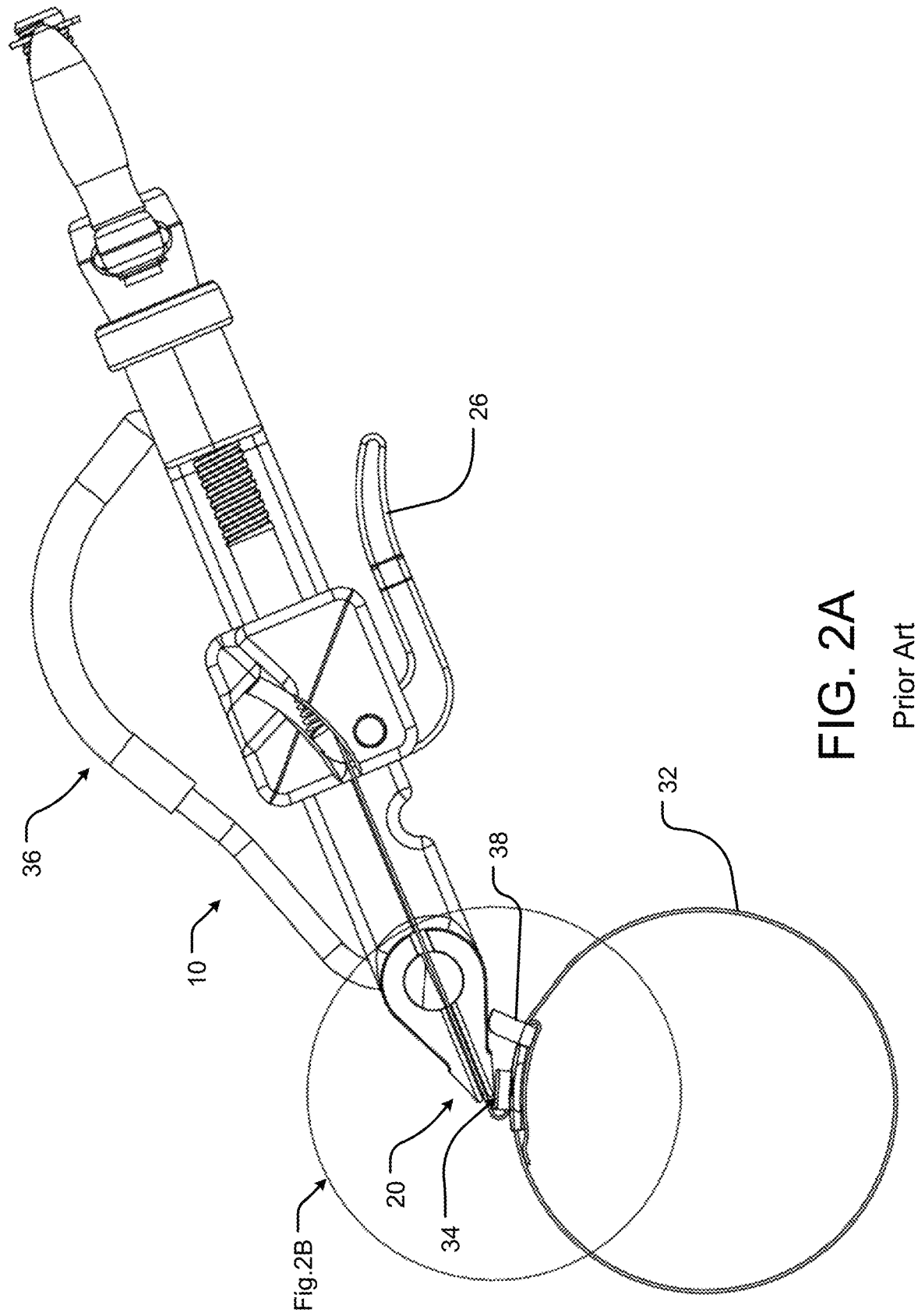
FIG. 2A is a side view of the prior art tension tool, band and buckle of FIG. 1.
Figure 2B:
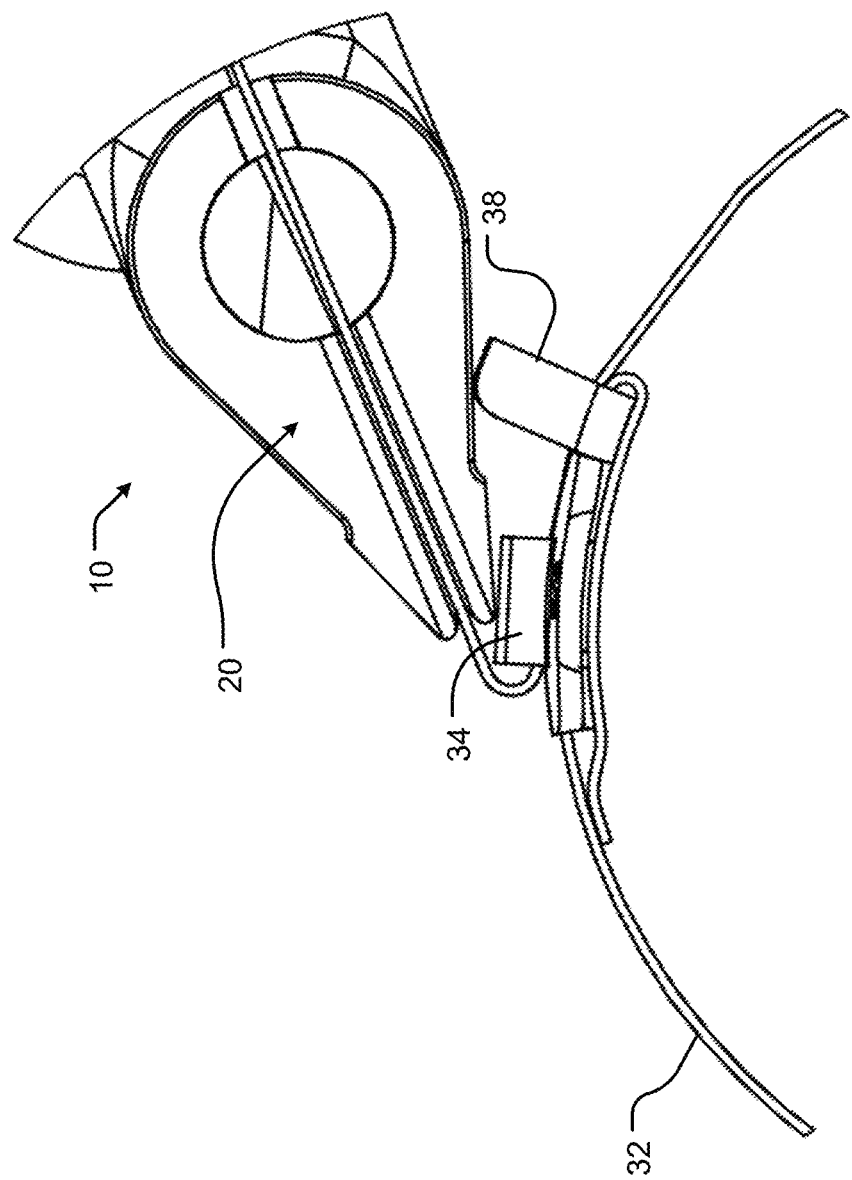
FIG. 2B is an enlarged view of a portion of the tension tool, band and buckle of FIG. 1, as noted in FIG. 2A.

With reference to FIGS. 7-10C, the buckle has a base 112 with an upper surface 114, a lower surface 116 and a trailing end 118. The opening 110 is formed by an underside of a bridge 122 extending away from the upper surface 114 of the buckle 104 (shown in FIGS. 9B, 10B, 11B, and 12B). When tensioning is complete, the bridge 122 provides a surface over which the free end of the band 102 can be bent or rolled over and secured thereto by buckle ears 124. Teeth 126 formed on the leading end of the bridge 122 assist to secure the band relative to the buckle. Thus, when the band 102 is installed on a workpiece, the band 102 is secured to the buckle 104 at both the loop of band 106 and at the opposite end. As best seen in FIG. 4, the loop 106 of band 102 also includes a tail 106d or free end that is engaged by the tool for purposes of tensioning the band. The gripper 24 of the tension tool 10 pulls the free end 106d of the band 102 through the buckle opening, adding a tensile force to the band 102. As seen in FIG. 6, during tensioning, the nose 20 of the tool 10 presses against the buckle 104 while the bend 106b in the band loop 106 pulls on the leading end 108 of the buckle 104. To complete the installation process, the tool 10 is rotated away from the installer to bend the free end 106d of the band over the bridge 122. FIG. 2B illustrates rotation of the tool 10. Lever 36 is actuated to sever the free end or tail 106d from the band 102.

Figure 9A:
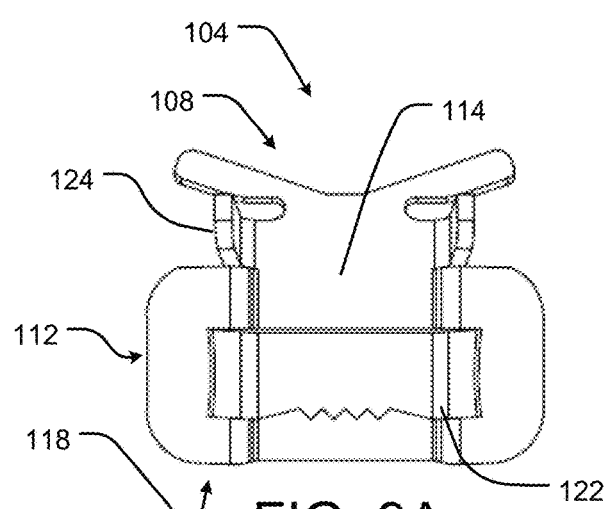
FIG. 9A is a top view of the buckle of FIG. 6 with a tension indicator in an untensioned or first state.
Figure 10A:
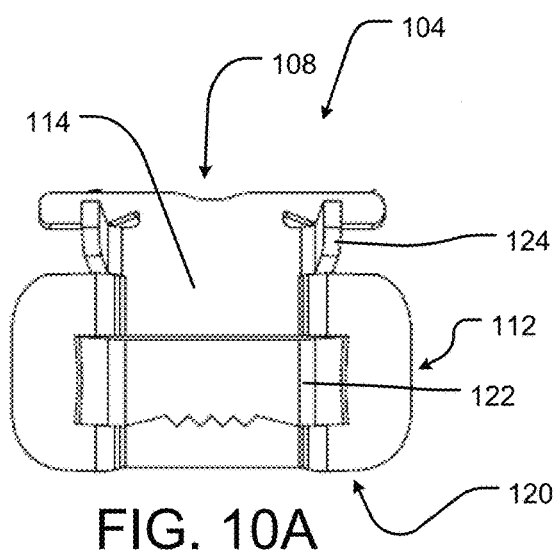
FIG. 10A is a top view of a buckle of FIG. 6 with a tension indicator in a second or fully tensioned state.
Figure 9B:
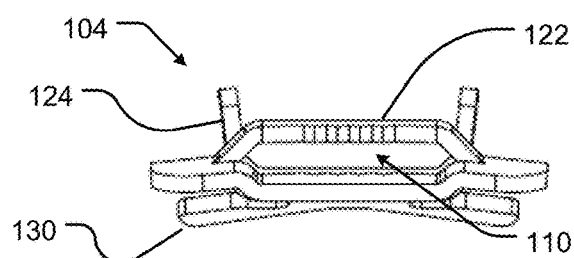
FIG. 9B is a front view of the buckle of FIG. 9A.
Figure 10B:
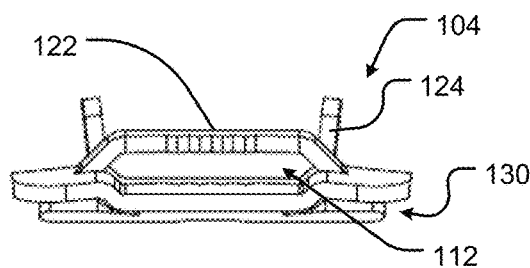
FIG. 10B is a front view of the buckle of FIG. 10A.
Figure 9C:
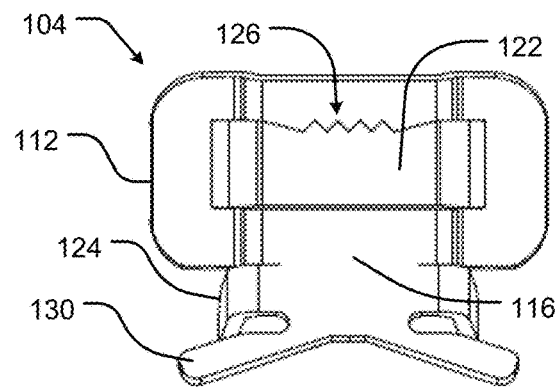
FIG. 9C is a bottom view of the buckle of FIG. 9A.
Figure 10C:
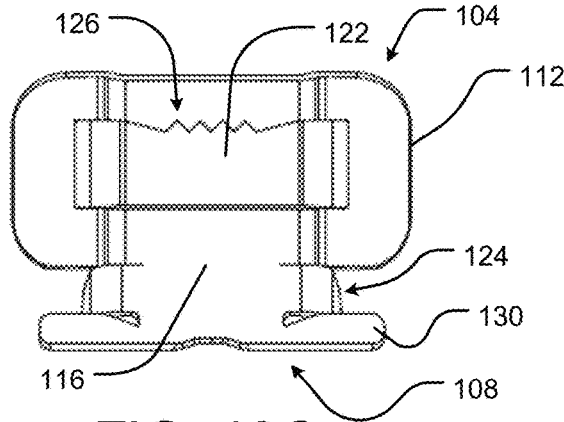
FIG. 10C is a bottom view of the buckle of FIG. 10A.
Figure 11A:
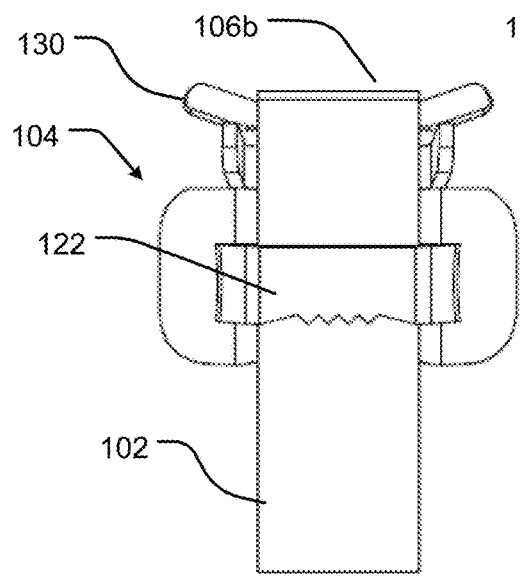
FIG. 11A is a top view of the buckle of FIG. 6 with a tension indicator in an untensioned or first state and a band.
Figure 12A:
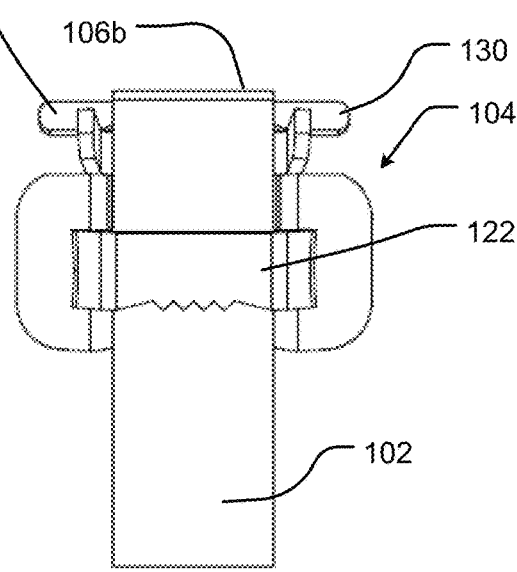
FIG. 12A is a top view of the buckle of FIG. 6 with a tension indicator in a second or fully tensioned state and a band.
Figure 11B:
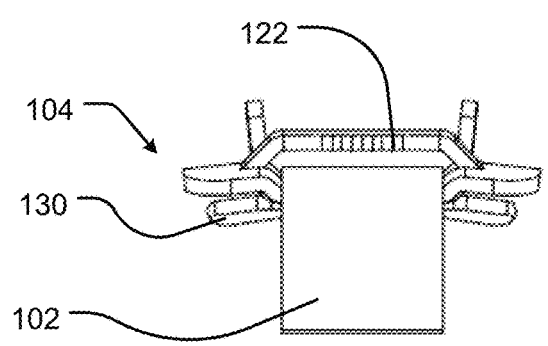
FIG. 11B is a front view of the buckle and band of FIG. 11A.
Figure 12B:
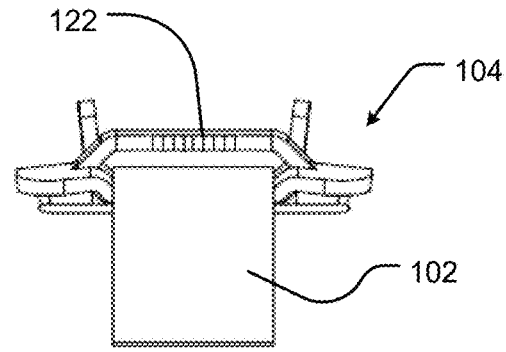
FIG. 12B is a front view of the buckle and band of FIG. 12A.
Figure 11C:
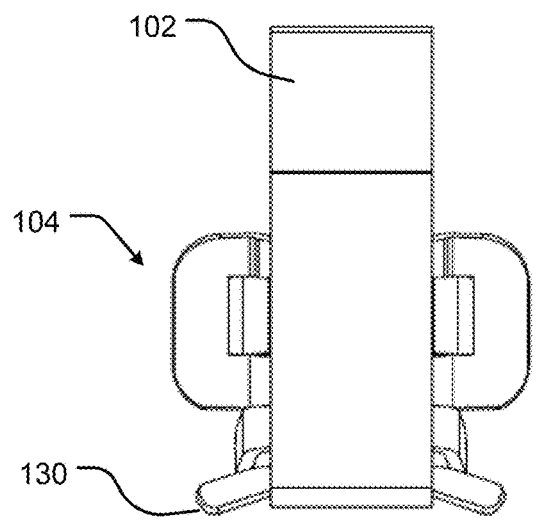
FIG. 11C is a bottom view of the buckle and band of FIG. 11A.
Figure 12C:
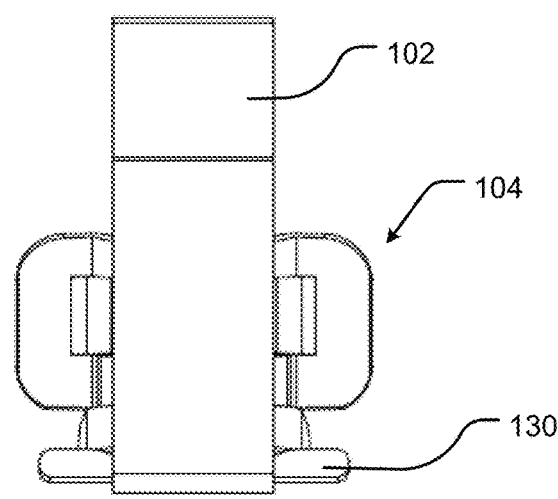
FIG. 12C is a bottom view of the buckle and band of FIG. 12A.
Figures 13A, 14A:
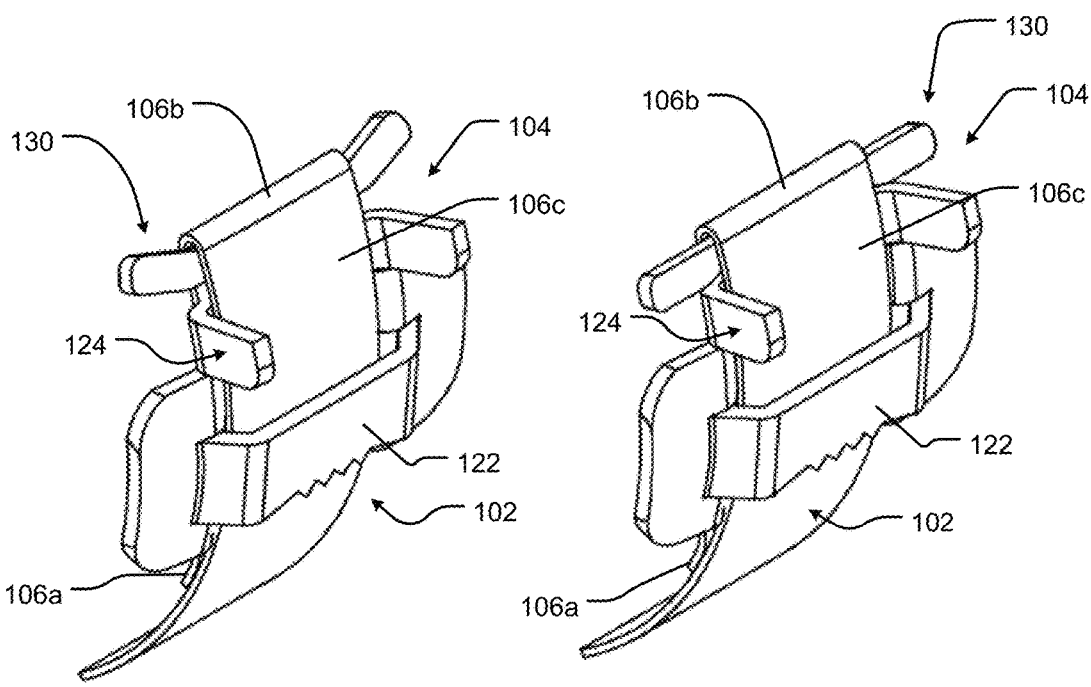
FIG. 13A is an isometric top view of the buckle and band of FIG. 6 with a tension indicator in an untensioned or first state.
FIG. 14A is an isometric top view of the buckle and band of FIG. 6 with a tension indicator in a second or tensioned state.
Figures 13B, 14B:
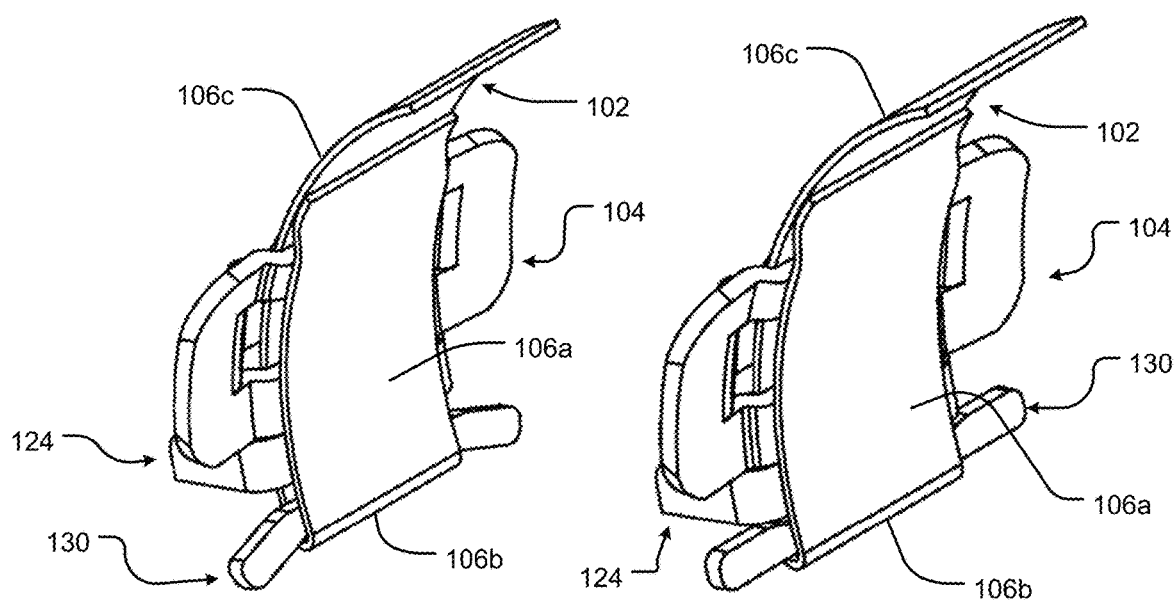
FIG. 13B is a bottom isometric view of the buckle and band of FIG. 13.
FIG. 14B is a bottom isometric view of the buckle and band of FIG. 14A.
Figure 15:
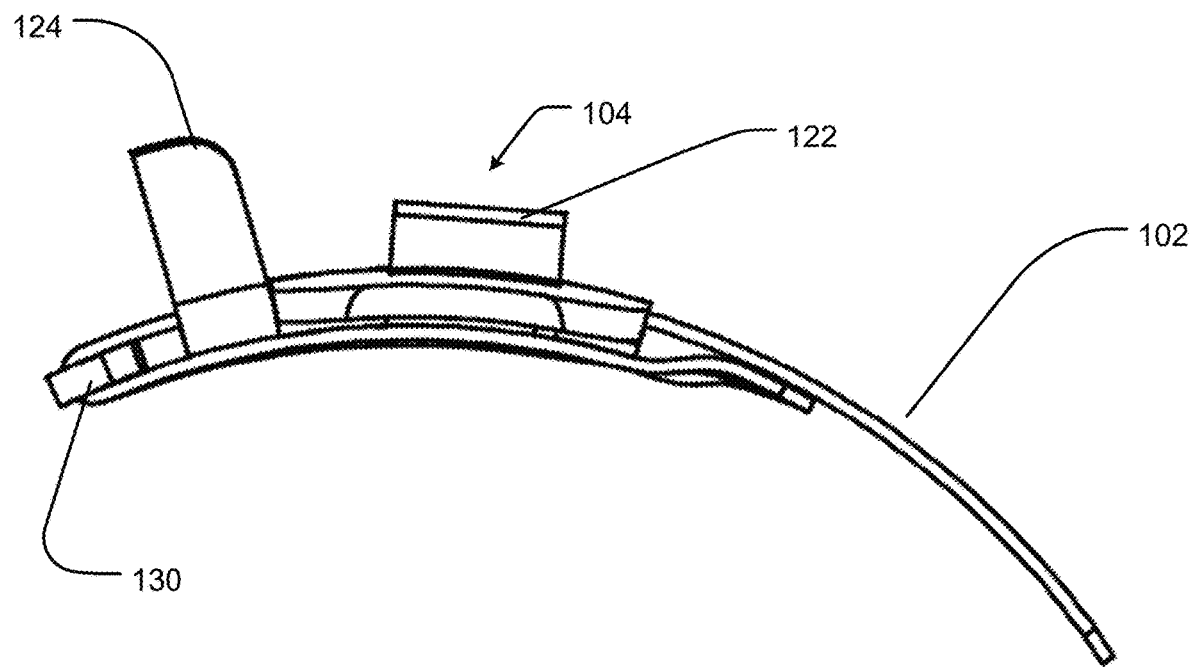
FIG. 15 is a side view of the buckle and a band of FIG. 14A.

FIGS. 7 and 8 illustrate the buckle 104 with a tension indicator 130 in an untensioned or first state and a tensioned or second state, respectively. The tension indicator is formed at an acute angle α relative to a centerline c/l of the buckle. As also illustrated, the buckle 104 includes a base 112. FIGS. 9A-9C also illustrate the buckle 104 with a tension indicator 130 in an untensioned or first state and FIGS. 10A-10C illustrate the buckle 104 with the tension indicator 130 in a tensioned or second state. The buckle 104 includes the tension indicator 130 formed by two strips or tabs of metal (also referred to as wings) in the same plane as the buckle base 114 or slightly above the same plane. As illustrated, it will be appreciated that the two strips are symmetric but alternatively could be asymmetric or a varying number of wings or different geometry, material, etc. The tension indicator 130 may also include any number of wings.

FIGS. 9A-9C, 11A-11C, and 13A-13B illustrate a first embodiment of a buckle 104 according to the present disclosure with the band 102 and the tension indicator 130 in the untensioned or first state. In contrast, FIGS. 10A-10C, 12A-12C and 14A-14B illustrate the buckle 104 with the band 102 and the tension indicator 130 in the tensioned or second state. As seen in FIGS. 11A, 11C, 12A, 12C and 13A-14B, the band loop 106b wraps over the tension indicator 130 and through the buckle 104. The bend 106b in the loop of band material 106 is wrapped around the tension indicator 130. During tensioning, the tension tool 10 pulls the free end 106d of the band 102 through the buckle 104 while the nose 20 of the tool 10 abuts or presses against the end buckle 104 at the bridge 122 or trailing end 118 or both, as seen, for example, in FIGS. 4-6. The nose 20 abutting the buckle 104 stabilizes the position of the buckle and enables the tool 10 to tension the band 102 while remaining in the same or similar position close to the workpiece. Thus, as tension is increased, the bend 106b of the loop of band 106 is pulled against the tension indicator 130 and the tension indicator 130 starts to bend or deform under the resultant compressive force of the loop of band 106 caused by the tensile force from the tension tool 10. More specifically, the tension indicator 130 moves from a first position when in an untensioned state (shown in, for example, FIGS. 9A and 11A) to a second position when the tension indicator 130 has received a desired tension (shown in, for example, FIGS. 10A and 12A). In other words, increasing the tension in the band 102, forces the tension indicator or wings 130 to transition or move to a second predetermined position visually indicating the correct tension has been met. In some embodiments, the tension indicator or wings 130 are crushed or deformed when moved between the first and second positions.

Since the desired tensile force in the band 102 can be predetermined by the material properties and geometry of the tension indicator 108, the tension indicator 108 can be designed or configured to change states at a desired tension that is less than the material yield strength of the band 102. This eliminates the initial step of over tensioning the band and the subjective step of unwinding or relaxing the tool tensioning rod while folding or rotating the band 102 on top of itself. Once the tension indicator 130 fully activates, the installer can simply fold the band 102 over itself and over the bridge 122, cut odd the free end 106d, and lock the band and buckle into place by repositioning one or more buckle ears 124 against the band 102. By removing the unwinding or tension relaxing step, the retained force has been shown to be both closer to the targeted retention force and more consistently achieved, therefore eliminating variability seen from installer to installer.

Figure 16:
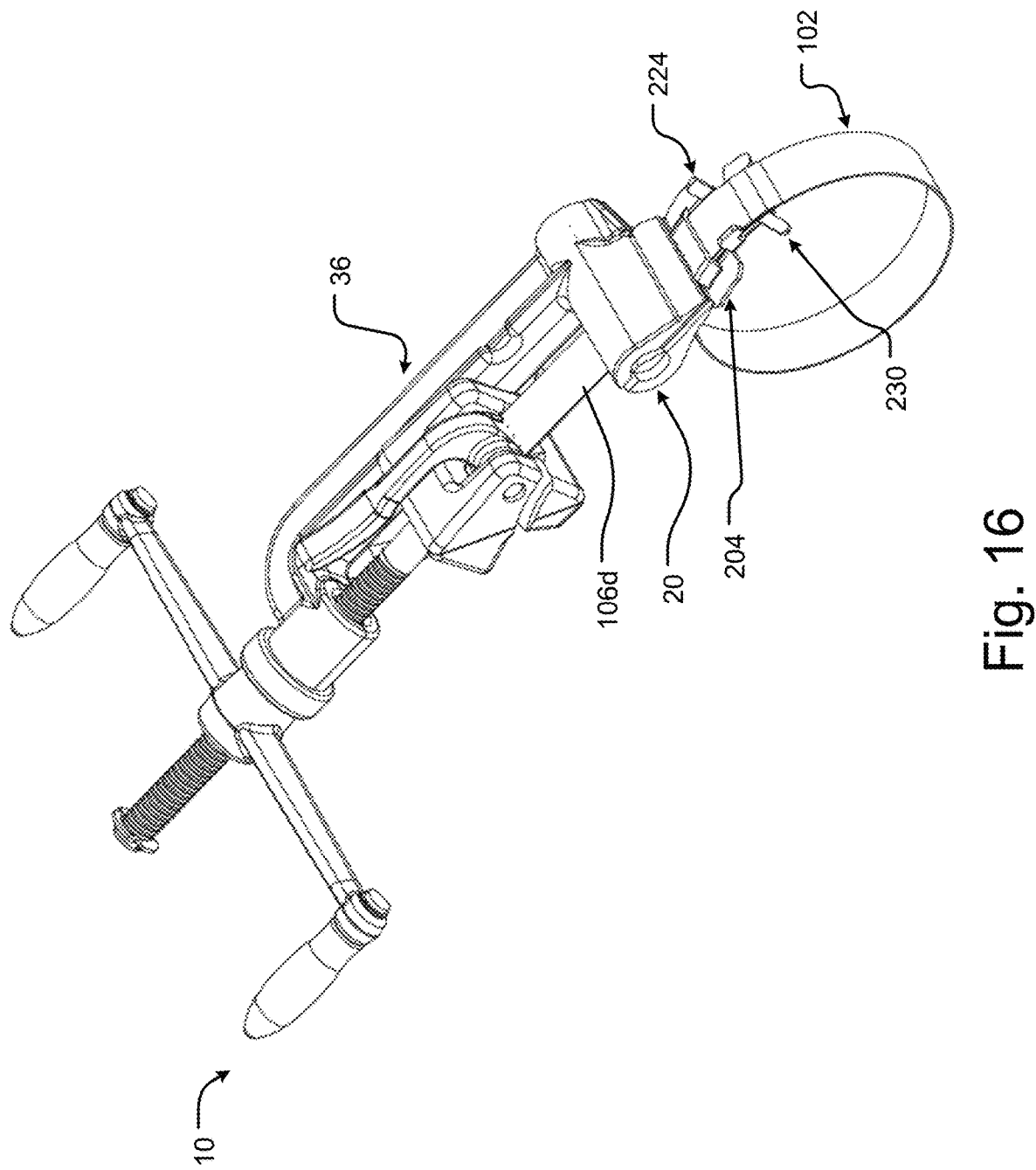
FIG. 16 is an isometric view of the prior art manual tensioning tool and band of FIGS. 4 and 5, with a second embodiment of a buckle according to aspects of the present disclosure.
Figure 17:
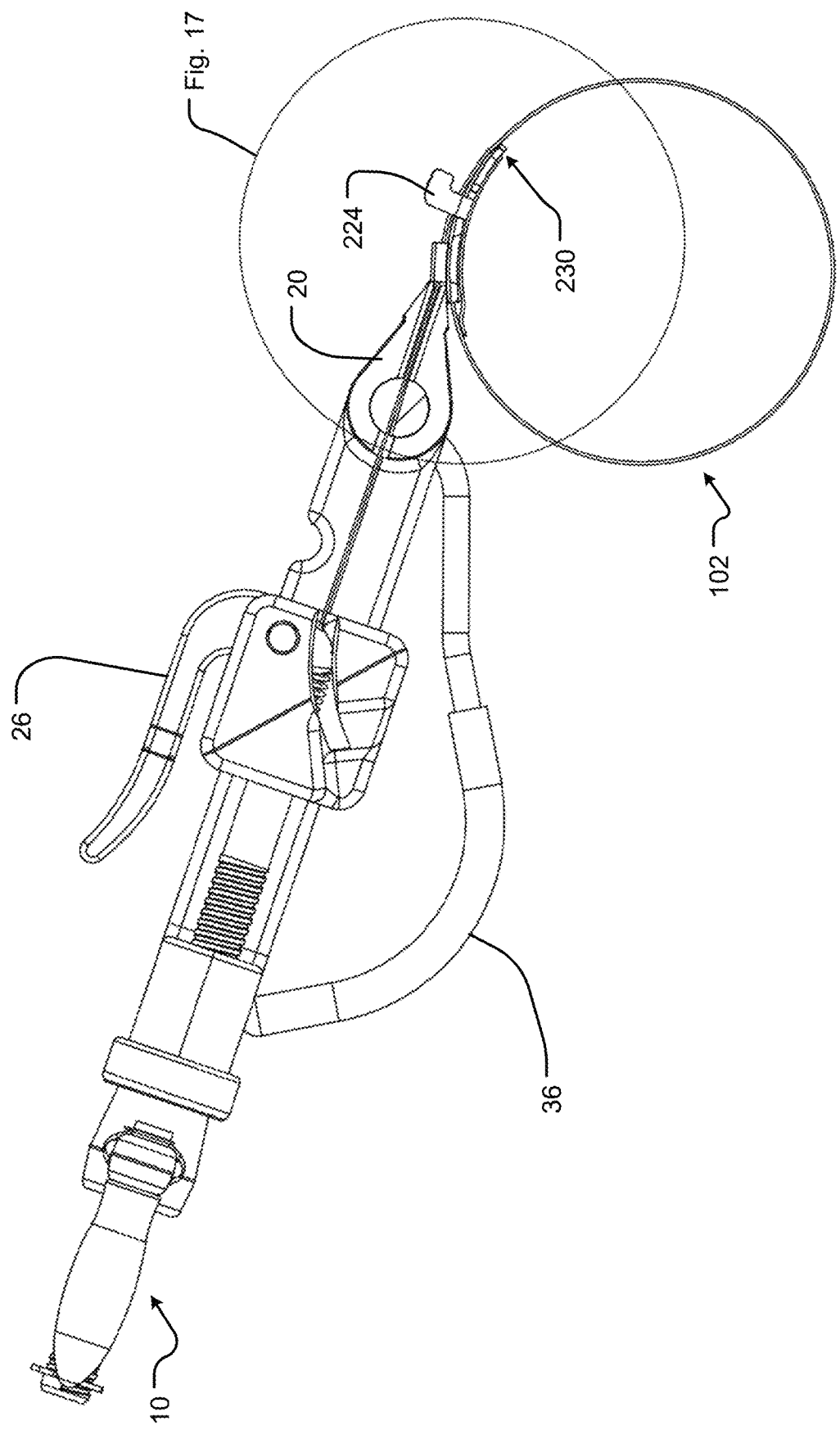
FIG. 17 is a side view of the tension tool, band and buckle of FIG. 16.
Figure 18:
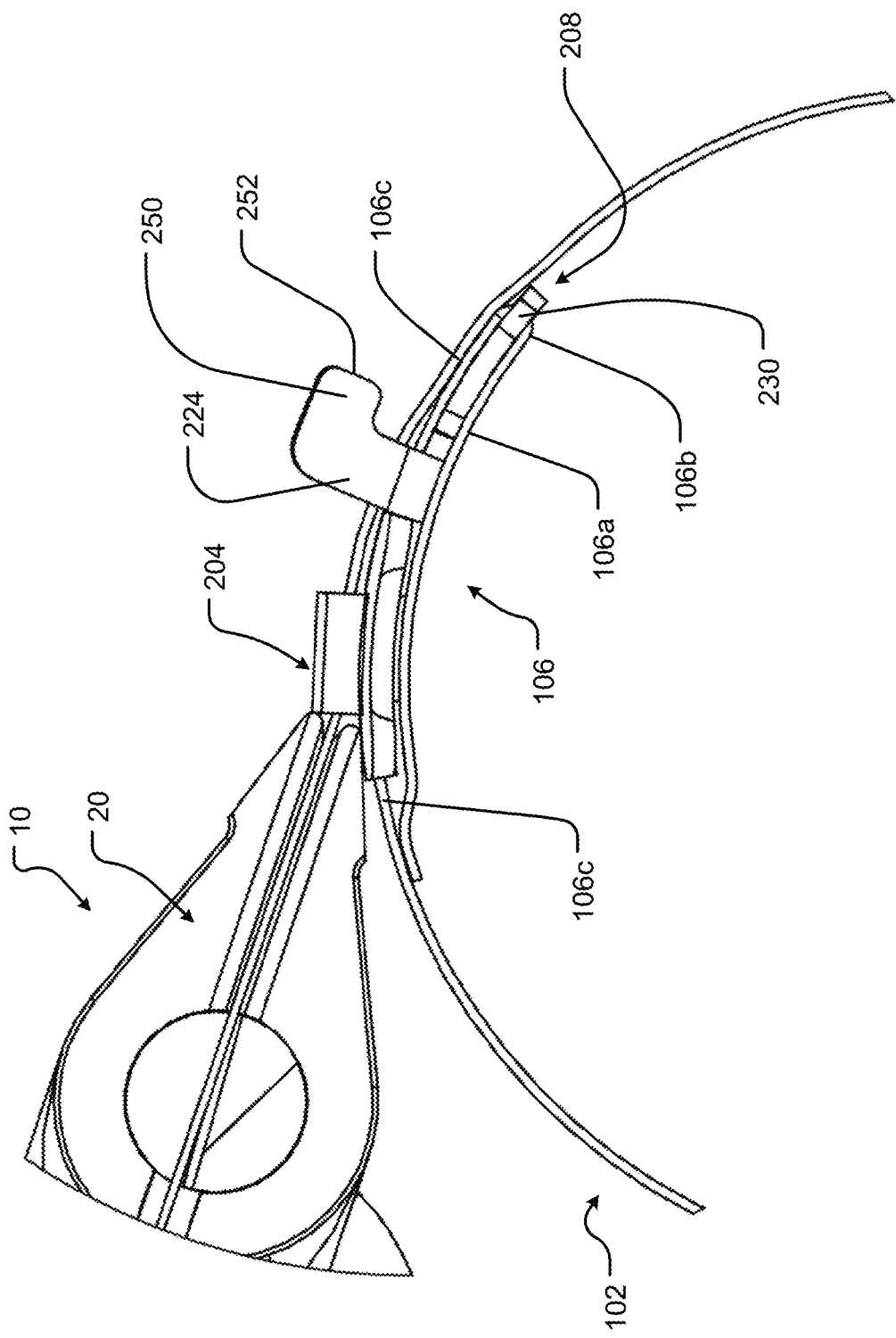
FIG. 18 is an enlarged view of a portion of the tension tool, band and buckle of FIG. 16.

Turning to FIGS. 16-26, a second embodiment of buckle with a tension indicator according to the present disclosure is illustrated. More particularly, FIGS. 16-18 illustrate the same manual tensioning tool as illustrated in FIGS. 1-6 with a different buckle. As with the prior embodiment, a loop of band 106 is formed at one end of a band by the installer either prior to installation or during installation. One portion of the loop 106a is positioned under the buckle 204. A second portion 106b comprising a bend in the loop wraps around the leading end 208 of the buckle 204. A third portion of the loop 106c extends through an opening 210 in the buckle 204 and the opposite or free end 106d is wrapped around a workpiece (e.g., the pole or one or more objects) and back through the buckle opening 210 once again.

Details of the buckle 204 are best seen in FIGS. 19-26. The buckle 204 has a base 212 with an upper surface 214, a lower surface 216 and a trailing end 218. The opening 210 is formed by an underside of a bridge 222 extending away from the upper surface 214 of the buckle 204. When tensioning is complete, the bridge 222 provides a surface over which the free end of the band 102 can be bent or rolled over and secured thereto by buckle ears 224. Teeth 226 formed on the leading end of the bridge 222 assist to secure the band relative to the buckle. Thus, when the band 102 is installed on a workpiece, the band 102 is secured to the buckle 204 at both the loop of band 106 and at the opposite end. As best seen in FIG. 16, the band 102 also includes a tail 106d or free end that is engaged by the tool for purposes of tensioning the band. The gripper 24 of the tension tool 10 pulls the free end 106d of the band 102 through the buckle opening 210, adding a tensile force to the band 102. As seen in FIG. 18, during tensioning, the nose 20 of the tool 10 presses against the buckle 204 while the bend 106b in the band loop 106 pulls on the leading end 108 of the buckle 204. To complete the installation process, the tool 10 is rotated away from the installer to bend the free end 106d of the band over the bridge 222 (see, FIG. 2B that shows rotation of the tool 10 relative to a buckle). Lever 36 is actuated to sever the free end or tail 106d from the band 102.

Figure 19:
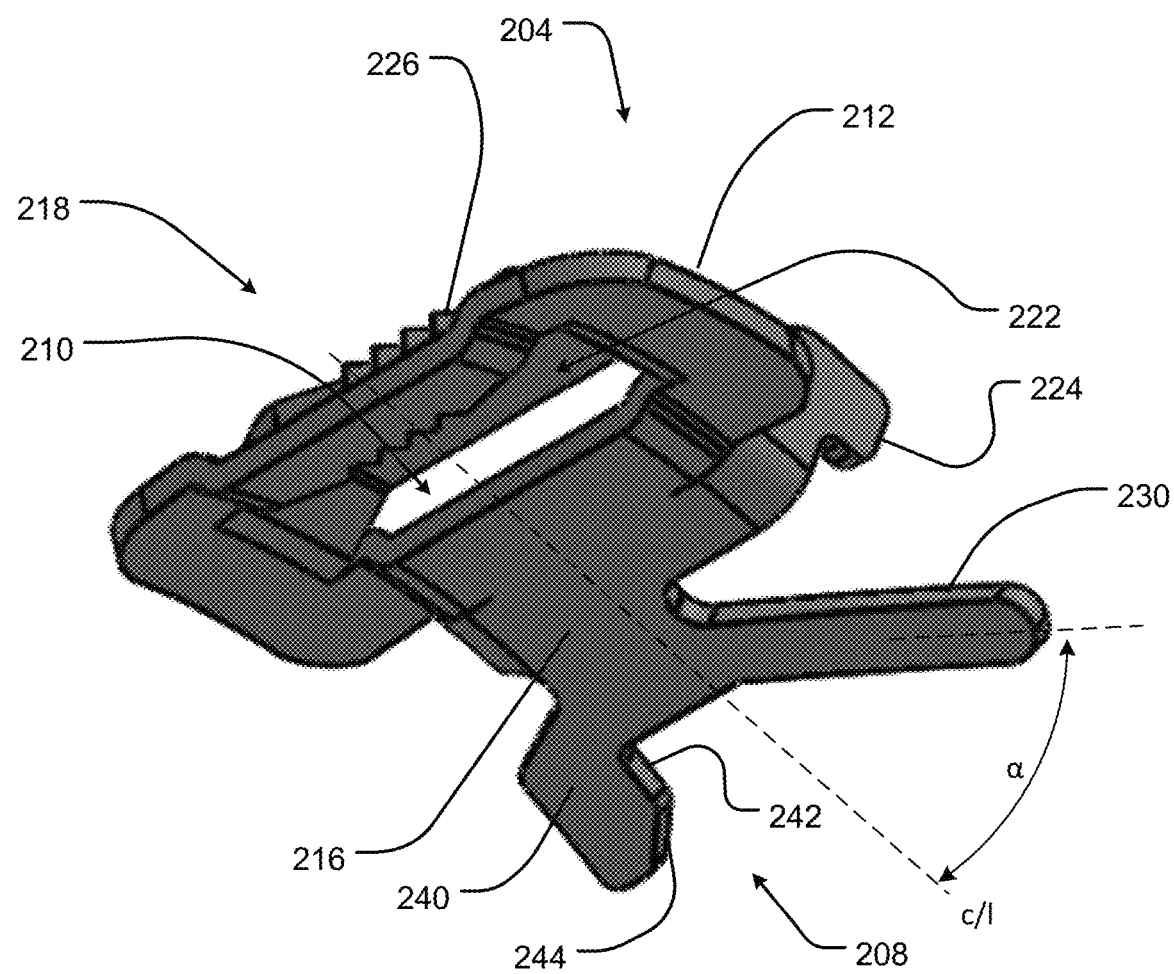
FIG. 19 is a bottom, tilted view of the buckle of FIG. 16 with a tension indicator in an untensioned or first state.
Figure 22A:
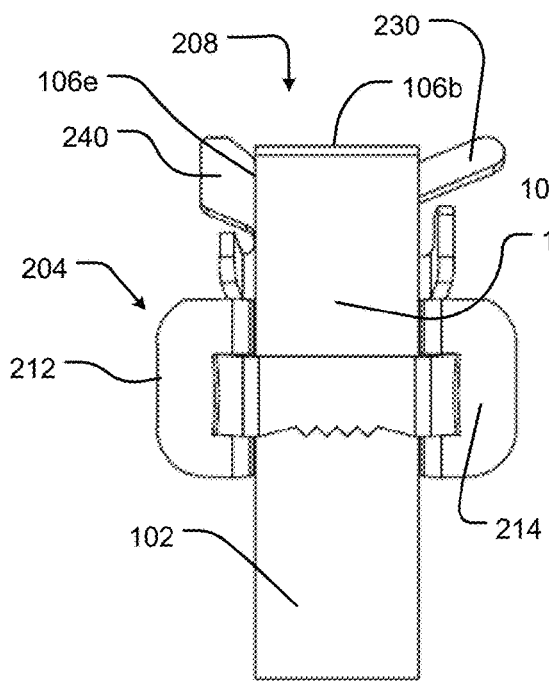
FIG. 22A is a top view of the buckle of FIG. 16 with a tension indicator in an untensioned or first state and a band.

Unlike the embodiment of FIGS. 4-15, the buckle 204 of FIGS. 16-26 has a single tension indicator 230. As shown in FIG. 19, for example, the tension indicator 230 is a single tab or wing that extends from the buckle laterally outwardly proximate the leading end 218 of the buckle 204. The tension indicator is formed at an acute angle α relative to the centerline of the buckle. Opposite the tension indicator 230 and also extending from the buckle proximate the leading end 218 is a guide arm 240. The guide arm 240 includes a guide surface 242 that functions to contact a lateral edge 106e of the band 102 as seen in FIGS. 22A-23C. Comparing FIGS. 24A and 25A, as the band 102 is initially subjected to tensioning, the lateral edge 106e of the band 102 may abut the chamfer 244. Upon further tensioning, the lateral edge 106e abuts the guide surface 242 which assists in maintaining the position of the band 102 relative to the buckle 204 in order to achieve proper tensioning and proper operation of the tension indicator 230. The guide surface 242 of the guide arm 240 may also include a chamfer 244 to further assist in locating the band properly relative to the guide surface, for example, when the installer is initially beginning to tension the band 102 with a tensioning tool.

Figure 23A:
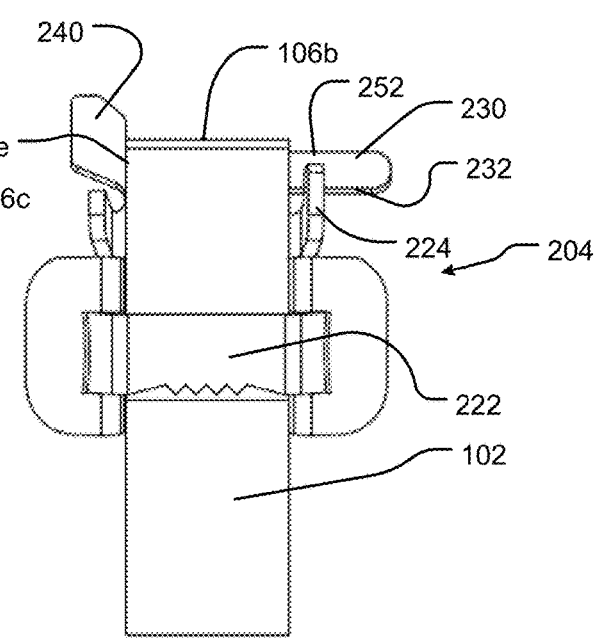
FIG. 23A is a top view of the buckle of FIG. 16 with a tension indicator in a second or fully tensioned state and a band.
Figure 22B:
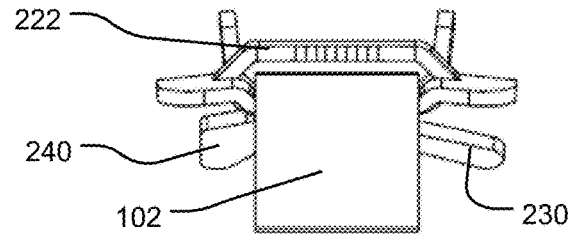
FIG. 22B is a front view of the buckle and band of FIG. 22A.
Figure 23B:
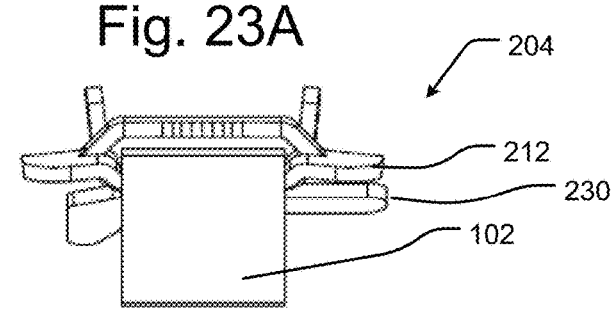
FIG. 23B is a front view of the buckle and band of FIG. 23A.
Figure 22C:
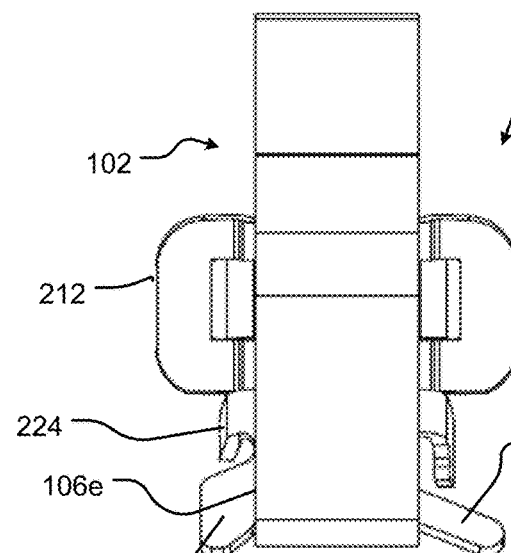
FIG. 22C is a bottom view of the buckle and band of FIG. 22A.
Figure 23C:
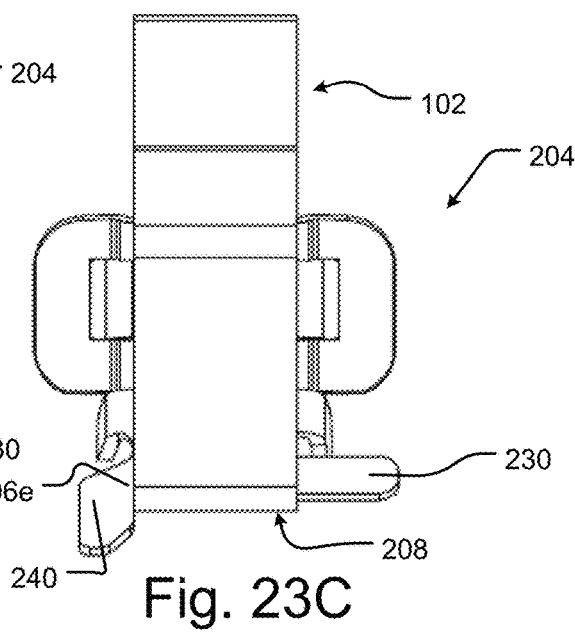
FIG. 23C is a bottom view of the buckle and band of FIG. 23A.
Figures 24A, 25A:
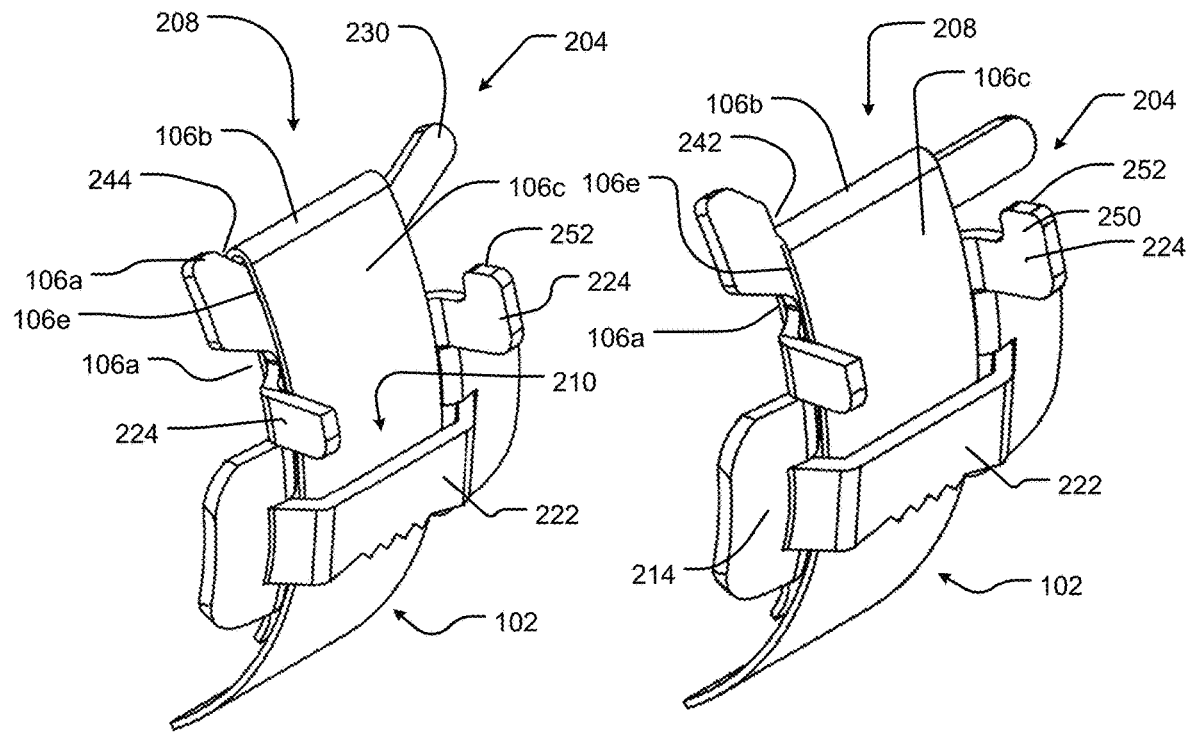
FIG. 24A is an isometric top view of the buckle and band of FIG. 16 with a tension indicator in an untensioned or first state.
FIG. 25A is an isometric top view of the buckle and band of FIG. 16 with a tension indicator is a second or tensioned stated.
Figures 24B, 25B:
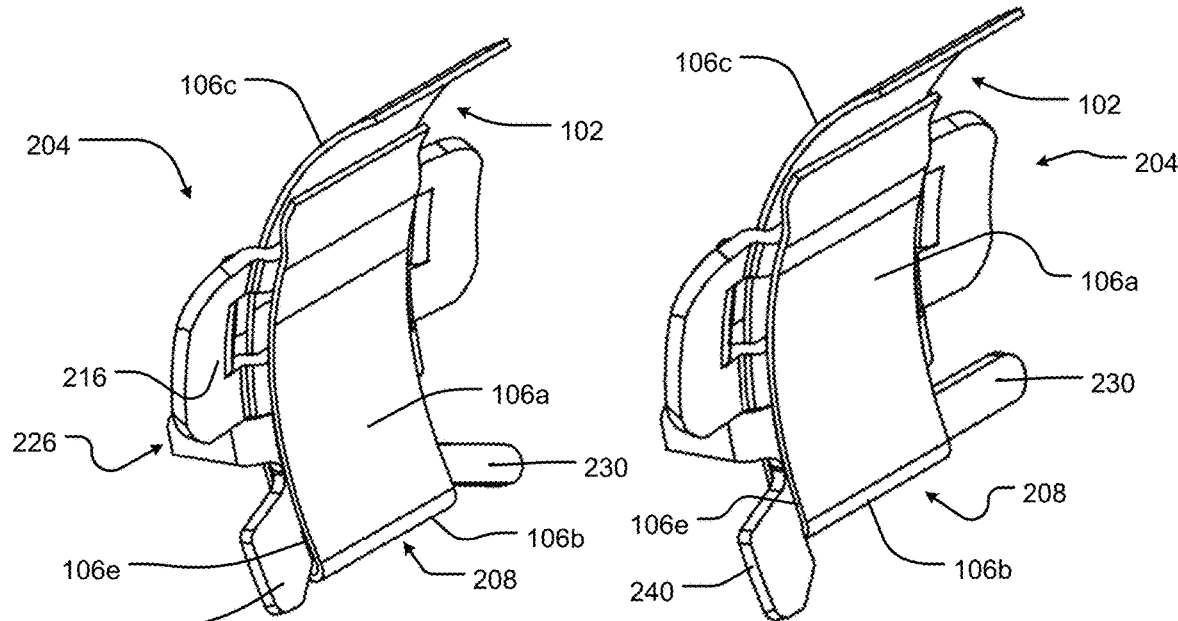
FIG. 24B is a bottom isometric view of the buckle and band of FIG. 24A with a tension indicator in a second of tensioned state.
FIG. 25B is a bottom isometric view of the buckle and band of FIG. 25A.
Figure 26:
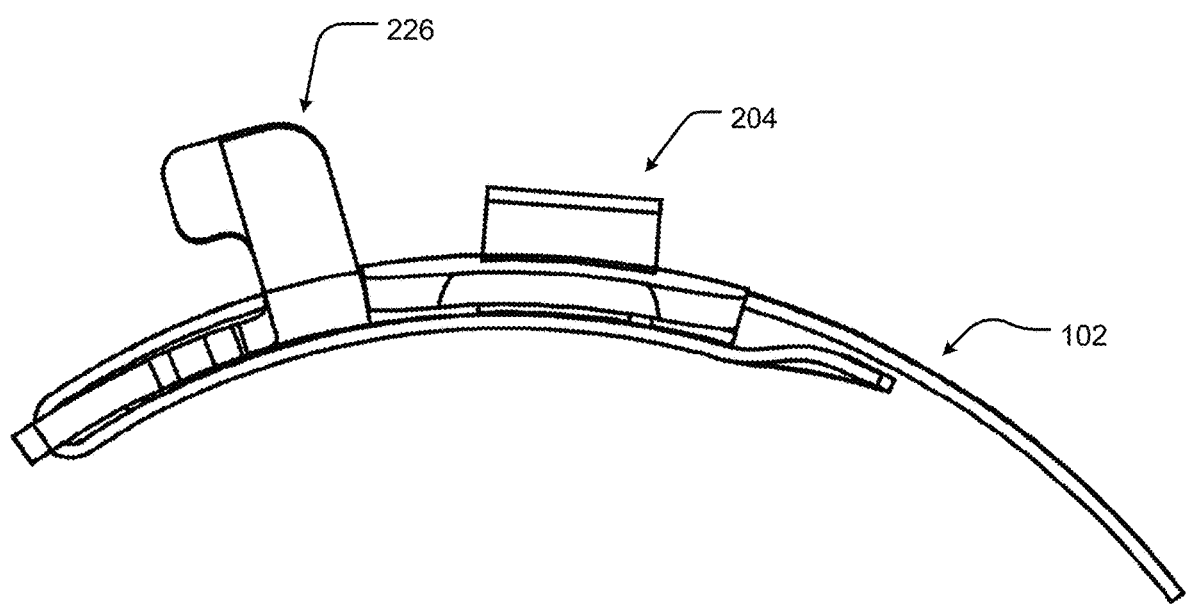
FIG. 26 is a side view of the buckle and band of FIG. 25A.

Also regarding the embodiment of FIGS. 16-26, at least one of the buckle ears 224 may be configured with a nose or extension 250 that includes a leading edge 252 (FIGS. 18, 24A and 25A), With reference to FIG. 23A, when the tension indicator 230 has moved to the second position, the lateral edge 232 of tension indicator 230 will align with the leading edge 252 of the extension 250 of the ear lock 224, which when viewed directly from above. The visual confirmation can be done before the ear lock 224 is bent or after it is bent. The edges 232 and 252 will visually align in a common plane.

Figure 27A:
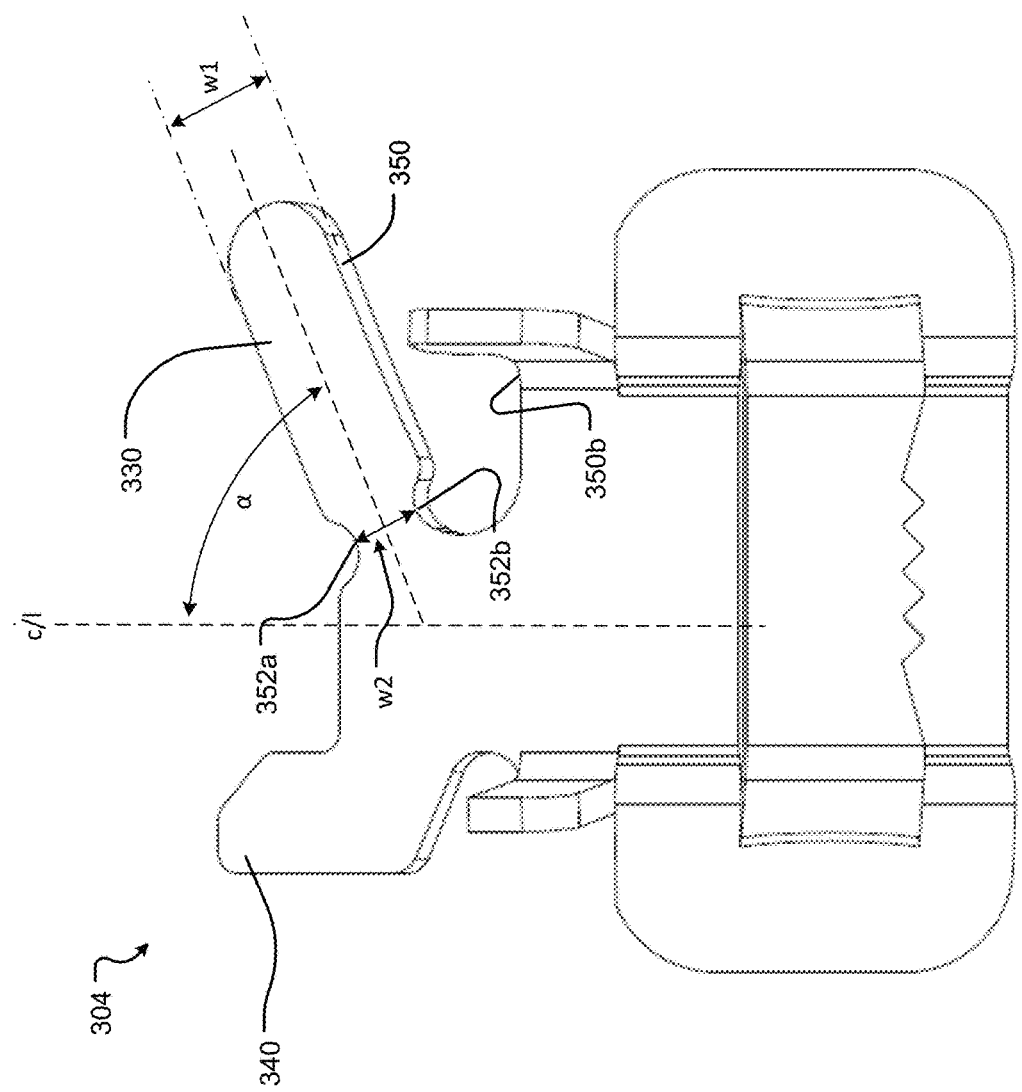
FIG. 27A is a top view of a third embodiment of a buckle according to aspects of the present disclosure.

A third embodiment of a buckle 304 according to the present disclosure is illustrated in FIGS. 27A (a first untensioned state) and 27B a second tensioned state). Here, the side edge 350 of the base 312 of the tension indicator 330 includes two contours or notches 352a and 352b which function to locate the area or point where the tension indicator 330 will bend upon tensioning of the band 102. The notches reduce the lateral width of the tension indicator 330 from $w_1$ to $w_2$ and thereby define the location where the tension indicator 330 will bend. In a preferred embodiment, the cut outs are located where the indicator is expected to deform. The indicator is a moment arm that begins at the center of the top notch or cut out. The length of the moment arm may be adjusted to decrease or increase the force needed to collapse the indicator. By pre-locating or predetermining the place where the tension indicator bends or deforms upon tensioning, consistent and repeatable tension is achieved from one buckle to the next. Also, the minimum thickness from the top notch to the bottom notch is the effective width of the indicator and also plays into the force needed to collapse the indicator. In the illustrated embodiment, the notches are circular or have a fixed radius. In the illustrated embodiment, the diameter is approximately 0.140 inches, which is two times (2X) the metal thickness of the buckle.

Figure 28A:
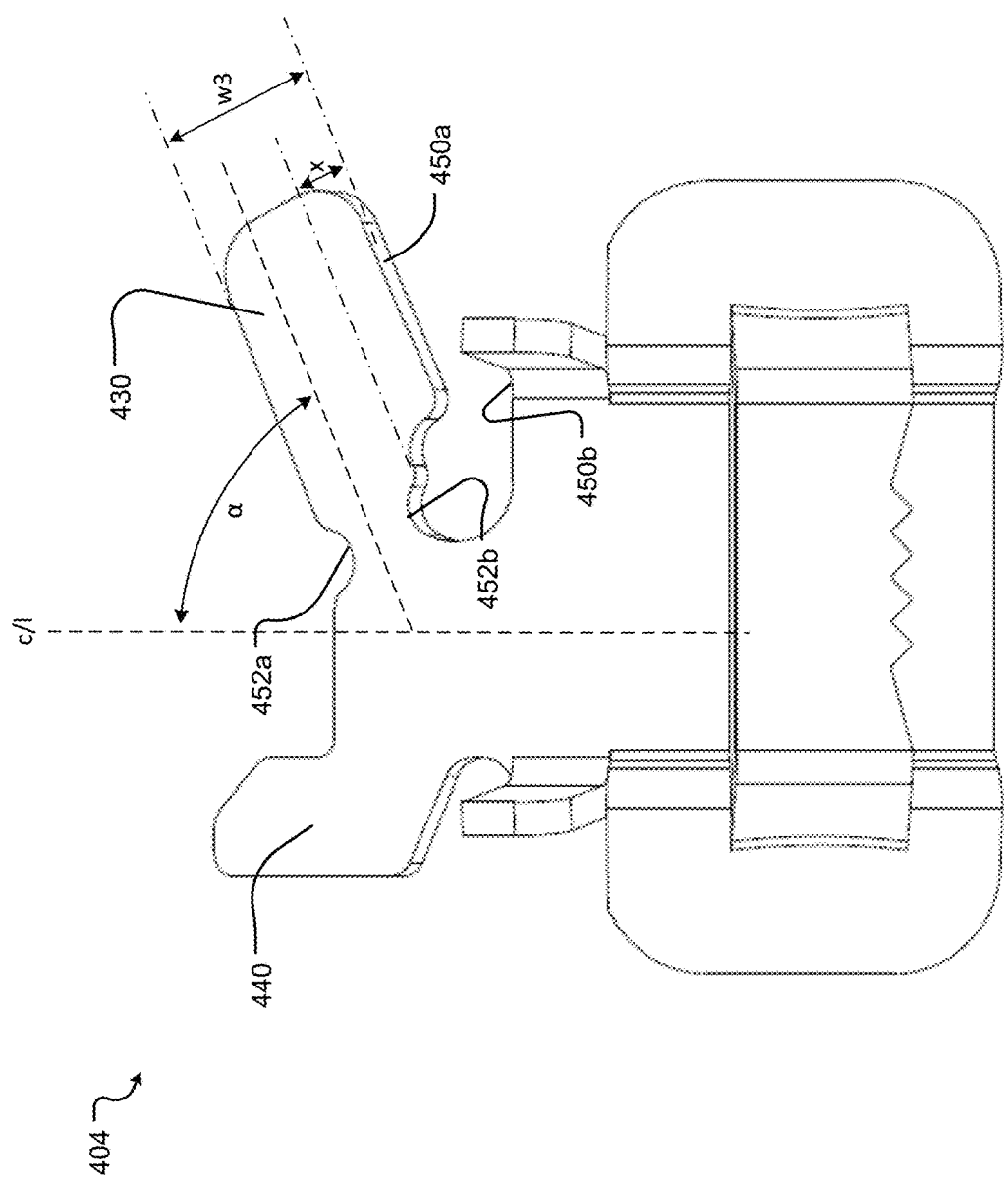
FIG. 28A is a top view of a fourth embodiment of a buckle according to aspects of the present disclosure.
Figure 28B:
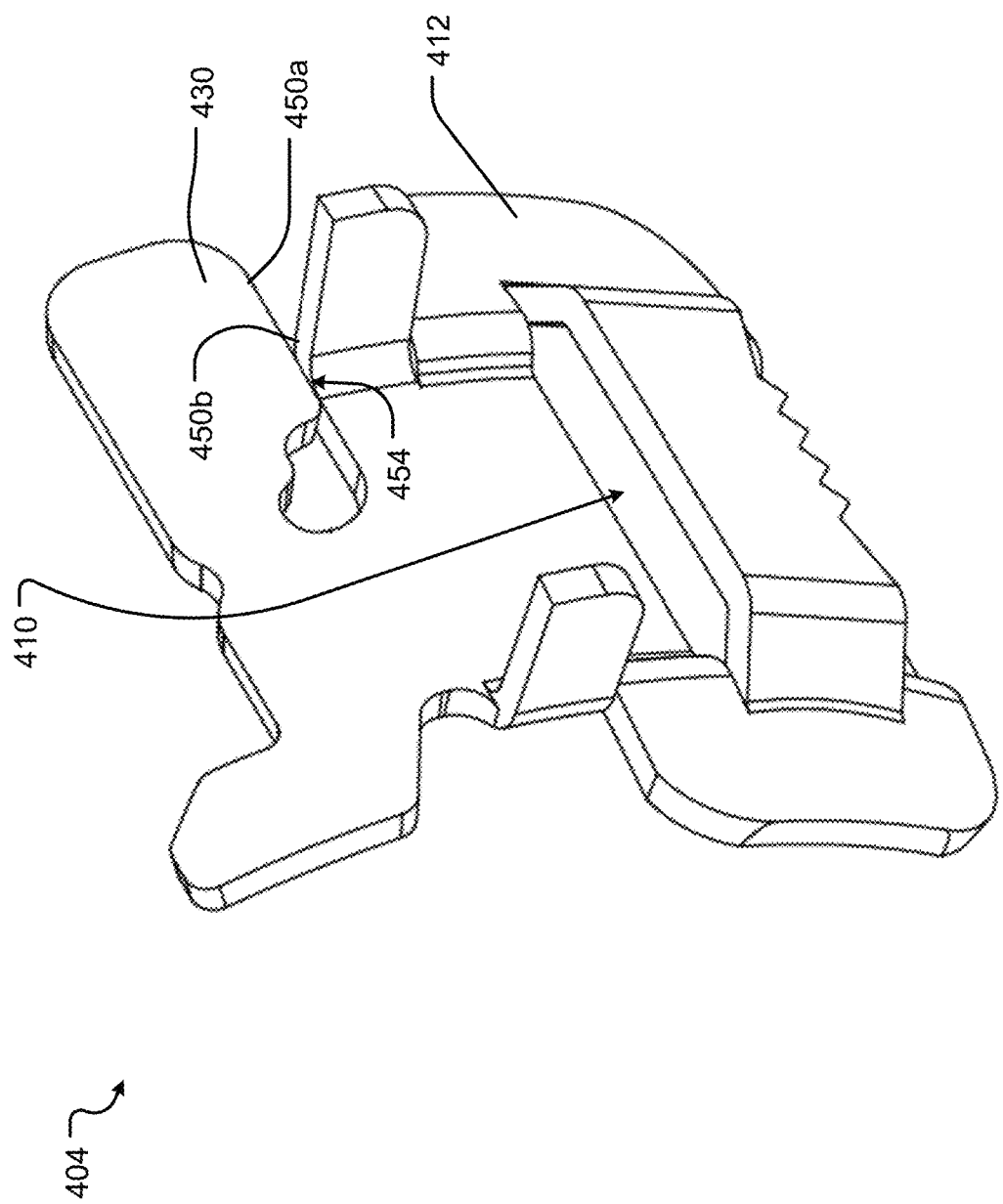
FIG. 28B is an isometric view of the buckle of FIG. 28A.

Turning to FIGS. 28A and 28B, a fourth embodiment of a buckle 404 according to the present disclosure is illustrated. FIG. 28A illustrates a first or untensioned state. FIG. 28B illustrates a second or tensioned state. Here, the width "$w_3$" of the tension indicator 430 is increased compared to the other embodiments, e.g., $w_1$ in FIG. 27A, by extending the width $w_1$ by a dimension "x" compared to the tension indicator 330 of FIG. 27A. In this embodiment, when the tension indicator is moved to the second position (FIG. 28B), an abutting interface 454 is formed by the two edges 450a and 450b and creates a hard stop that an operator can tactilely detect. This promotes repeatability and consistency from buckle to buckle and installer to installer. Ideally, the tension indicator 430 will move to a second state or position where the edge surface 450a will abut edge surface 450b and form an interface 454 with the two surfaces substantially parallel and abutting as shown in FIG. 28B.

In one embodiment, the buckle material is annealed 201 stainless steel, with a thickness of 0.070 plus or minus 0.0030 inches. Other metals and alloys with varying thicknesses may be used as would be understood by those of skill in the art upon review of the present disclosure.

Figure 1:
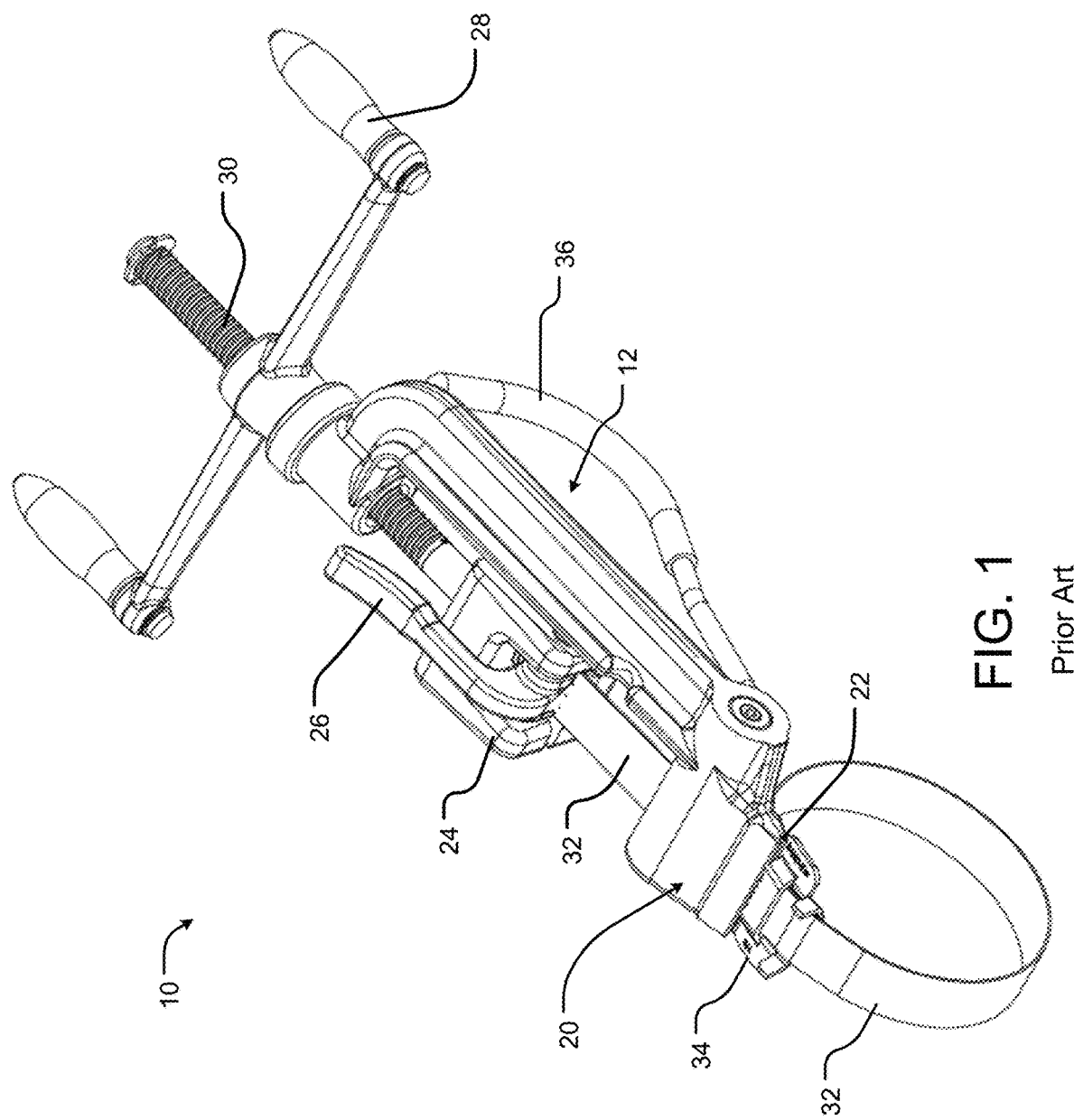
FIG. 1 is an isometric view of a prior art manual tension tool, band and buckle.
Figure 3:
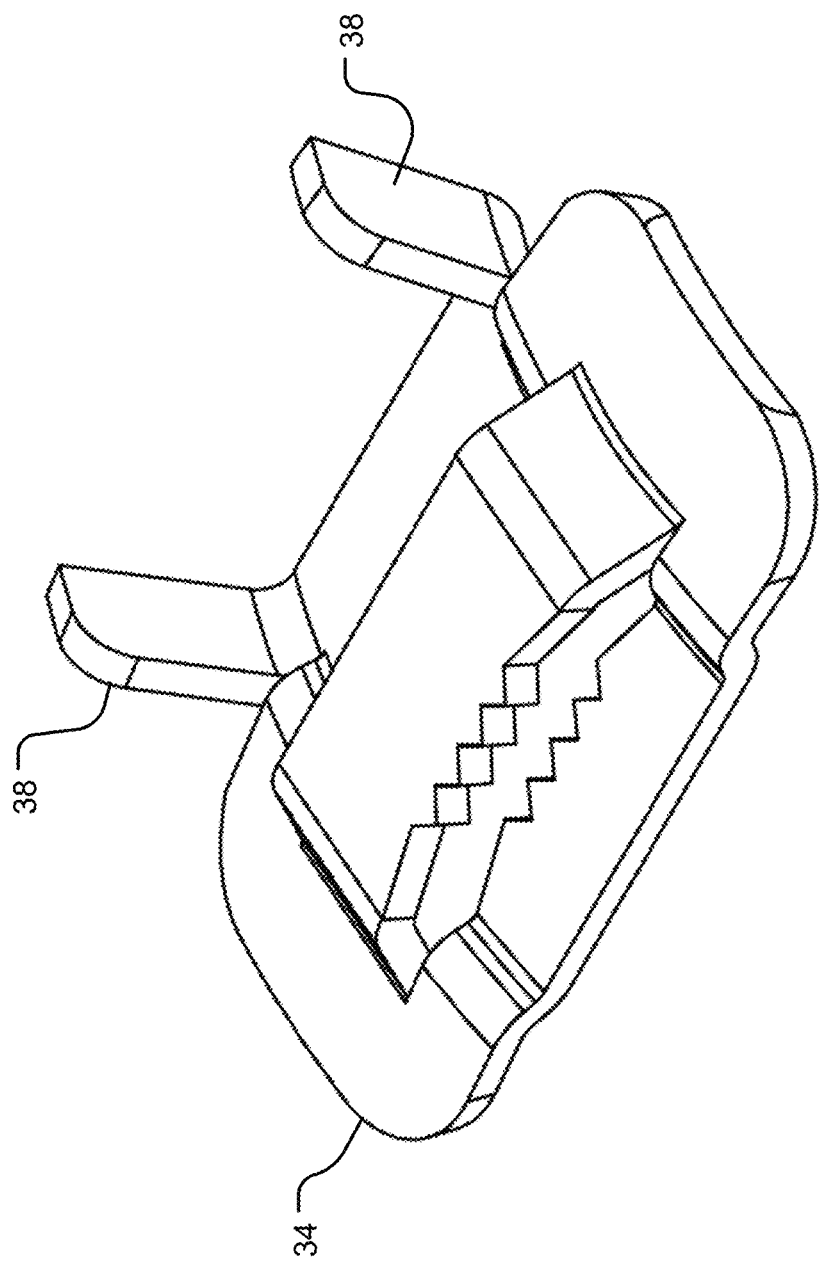
FIG. 3 is a side view of the buckle shown in FIGS. 1 and 2.

In one example, assume a targeted retained force is about 400 lbs. Using prior art bands, buckles and manual tensioning methods, for example, as illustrated in FIGS. 1-3, the retained force of the band and buckle combination following installation may vary from 100 lbs (significantly under tensioned) to 700 lbs. With buckles made according to the embodiments of FIGS. 4-28B, the variation in retained force will be improved. For example, variation in under tensioning will be reduced and on average increased to approximately 250 lbs and upper end tensioning will remain comparable at approximately 700 lbs. As a result, the average retained force will be increased. With the embodiments of FIGS. 27 and 28, it is believed the range of variability in retained force with be further narrowed and with optimized notches or cutouts could be between 300 lbs and 400 lbs. In other words, the target retained force is achieved more consistently, which is advantageous for increasing the factor of safety on the band and/or buckle and/or reducing variability of the target retained force. The embodiments indicate that the proper tension force has been achieved, allowing the rollover process to be completed without backing off the tension force applied by the tool, eliminating a significant source of user-to-user variation.

By adding a tension indicator 130, 230, 330 and 430 in the form of a visual indicator in the buckle 104, 204, 304 and 404, respectively, that yields at a known tensile range and a predetermined orientation, the installer has a non-subjective indicator that establishes the band and buckle combination has been installed correctly with the targeted retained force to hold the desired component in place. Since there is an indication that proper tension has been achieved, the buckle 104, 204, 304 and 404 enables an installation procedure which does not require the user to release tension during roll over and thus greatly reduces installation variability. The tension indicator of the various embodiments is configured to move from a first position to a second position and thereby indicate proper tension has been achieved. Optionally, a hard stop may be included as part of the buckle design to provide additional tactile feed back to the installer. Optionally, the tension indicator may be configured to deform or change its shape, i.e., be crushed, upon moving from the first to the second position.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims.

What is claimed is:

1. A buckle configured to interact with a band for purposes of clamping one or more objects, the buckle comprising:
    a. a base having a leading end and a trailing end and an upper surface and a lower surface;
    b. at least one tab formed at the leading end of the base and extending away from the base at an angle; and
    c. a bridge extending away from the upper surface of the base and defining an opening between an underside of the bridge and the upper surface of the base,
    d. wherein when the band is undergoing tensioning by moving through the opening in a direction toward the trailing end of the base, the band engages the at least one tab, wherein the at least one tab is configured to move toward the trailing end of the base from a first position to a second position.

2. The buckle of claim 1, wherein the at least one tab is in a different plane than a plane of the base.

3. The buckle of claim 1, wherein the at least one tab is deformable.

4. The buckle of claim 1, wherein the at least one tab comprises two tabs and wherein the two tabs extend away from the leading end of the base in opposed directions at an angle relative to a centerline of the buckle.

5. The buckle of claim 4, wherein the angle is the same for each tab.

6. The buckle of claim 1 further comprising a guide arm extending away from the leading end of the base and laterally spaced from the at least one tab, the guide arm comprising a guide surface configured to engage a side edge of the band.

7. The buckle of claim 6, wherein the guide arm has a side edge that is configured to engage the side edge of the band.

8. The buckle of claim 7, wherein the side edge of the guide arm includes a first portion and a second portion oriented at an angle relative to the first portion.

9. The buckle of claim 1, wherein the at least one tab comprises a body with a first side edge and a second side edge opposite the first side edge, and the at least one tab further comprising at least one notch located along one of the first and second side edges of the at least one tab.

10. The buckle of claim 9, wherein the at least one notch comprises two notches and a second notch is located along the other of the first and second side edges of the at least one tab.

11. The buckle of claim 1, wherein when the at least one tab moves to the second position, the at least one tab contacts the base of the buckle.

12. The buckle of claim 1, further comprising at least one ear lock extending from the buckle, the ear lock having a first portion and a second portion that extends from the first portion, the second portion having a leading edge, and the at least one tab having a side edge, and wherein the leading edge of the second portion of the ear lock is coplanar with the side edge of the at least one tab when the at least one tab is in the second position and the at least one ear lock is unfolded.

13. A band clamp, comprising:
   a. a buckle having a base with a leading end and a trailing end and an upper surface and a lower surface, at least one tab formed at the leading end of the base and extending away from the base at an angle, and a bridge extending away from the upper surface of the base and defining an opening between an underside of the bridge and the upper surface of the base; and
   b. an elongate band having a first end and a second end, a loop formed in the first end of the band, the loop having a first portion that is positioned adjacent to the lower surface of the base of the buckle, a second portion that forms a bend in the band proximate the at least one tab and a third portion that extends along the upper surface of the base and through the opening between the bridge and the base of the buckle and wherein, when the band is subjected to tensioning, the bend engages the at least one tab and causes the at least one tab to move from a first position to a second position.

14. The band clamp of claim 13, wherein the at least one tab is co-planar with the base.

15. The band clamp of claim 13, wherein the at least one tab is in a different plane than a plane of the base.

16. The band clamp of claim 13, wherein the at least one tab comprises two tabs and wherein the two tabs extend away from the leading end of the base in opposed directions at an angle relative to a centerline of the buckle.

17. The band clamp of claim 16, wherein the angle is the same for each tab.

18. The band clamp of claim 13 further comprising a guide arm extending away from the leading end of the base and laterally spaced from the at least one tab, the guide arm comprising a guide surface configured to engage a side edge of the band.

19. The band clamp of claim 18, wherein the guide arm has a side edge that is configured to engage the side edge of the band.

20. The band clamp of claim 19, wherein the side edge of the guide arm includes a first portion and a second portion oriented at an angle relative to the first portion.

21. The band clamp of claim 13, wherein the at least one tab comprises a body with a first side edge and a second side edge opposite the first side edge, and the at least one tab further comprising at least one notch located along one of the first and second side edges of the at least one tab.

22. The band clamp of claim 13, wherein the at least one notch comprises two notches and a second notch is located along the other of the first and second side edges of the at least one tab.

23. The band clamp of claim 1, wherein when the at least one tab moves to the second position, the at least one tab contacts the base of the buckle.

24. A method comprising:
   a. providing a first length of band material having a first end and a second end;
   b. providing a buckle having a base with a leading end and a trailing end and an upper surface and a lower surface, the buckle also having at least one tab formed at the leading end of the base and extending away from the base at an angle, the buckle also having a bridge extending away from the upper surface of the base and defining an opening between an underside of the bridge and the upper surface of the base, wherein the at least one tab is configured to move from a first position to a second position;
   c. positioning the first end of the band material and a first portion of band material adjacent to the lower surface of the base of the buckle;
   d. wrapping a second portion of band material around the leading end of the buckle to form a loop of band material, the second portion of band material being a continuation of the first portion of band material;
   e. positioning a third portion of band material adjacent the upper surface of the base of the buckle, with the band material extending through the opening in the buckle;
   f. wrapping the second end of the band material around at least one object and through the opening; and
   g. tensioning the band material using a tension tool, wherein the band material engages the at least one tab and moves the at least one tab from the first position to the second position.

25. The method of claim 24, further comprising providing a second length of band material and a second buckle, repeating steps a-g with the second length of band material and the second buckle, and wherein a retained force of each of first and second lengths of band material tensioned with the first and second buckle is substantially the same.

26. The buckle of claim 1, wherein the at least one tab is co-planar with the base.

* * * * *